United States Patent [19]

Kawaguchi

[11] Patent Number: 5,578,155
[45] Date of Patent: Nov. 26, 1996

[54] METHOD AND APPARATUS FOR MANUFACTURING A SOLID OBJECT THROUGH SHEET LAMINATING

[75] Inventor: Noboru Kawaguchi, Komaki, Japan

[73] Assignee: Sanyo Machine Works, Ltd., Japan

[21] Appl. No.: 256,107

[22] PCT Filed: Oct. 28, 1993

[86] PCT No.: PCT/JP93/01567

§ 371 Date: Jun. 27, 1994

§ 102(e) Date: Jun. 27, 1994

[87] PCT Pub. No.: WO94/09971

PCT Pub. Date: May 11, 1994

[30] Foreign Application Priority Data

Oct. 28, 1992 [JP] Japan ................. 4-314111
Jan. 21, 1993 [JP] Japan ................. 5-27397

[51] Int. Cl.⁶ ............................................. B44C 3/02
[52] U.S. Cl. .................. 156/267; 156/85; 156/273.5; 156/273.7; 156/275.5; 156/275.7; 156/290; 156/379.8; 156/380.9; 156/516; 156/522; 264/405; 425/174.4
[58] Field of Search ................. 156/272.2, 273.3, 156/273.5, 273.7, 275.5, 275.7, 290, 267, 269, 379.6, 379.8, 380.9, 510, 516, 522, 58, 59, 63, 85; 264/22, 308, DIG. 59, 401, 405; 425/174.4

[56] References Cited

U.S. PATENT DOCUMENTS

| | | | |
|---|---|---|---|
| 2,171,259 | 8/1939 | Scott | 156/269 |
| 3,280,230 | 10/1966 | Bradshaw et al. | 264/22 |
| 3,301,725 | 1/1967 | Frontera | 156/59 |
| 3,539,410 | 11/1970 | Meyer | 156/58 |
| 3,932,923 | 1/1976 | DiMatteo | 29/407 |
| 4,575,330 | 3/1986 | Hull | 425/174.4 |
| 4,961,154 | 10/1990 | Pomerantz et al. | 364/522 |
| 5,015,312 | 5/1991 | Kinzie | 156/63 |
| 5,031,120 | 7/1991 | Pomerantz et al. | 364/522 |
| 5,088,047 | 2/1992 | Bynum | 264/22 X |
| 5,094,935 | 3/1992 | Vassiliou et al. | 264/22 X |
| 5,174,843 | 12/1992 | Natter | 156/155 |
| 5,182,055 | 1/1993 | Allison et al. | 264/401 |
| 5,183,598 | 2/1993 | Helle et al. | 264/22 |
| 5,217,653 | 6/1993 | Mashinsky et al. | 264/401 |
| 5,352,310 | 10/1994 | Natter | 156/155 |
| 5,354,414 | 10/1994 | Feygin | 156/630 |

FOREIGN PATENT DOCUMENTS

| | | |
|---|---|---|
| 50-1805 | 1/1975 | Japan. |
| 50-1806 | 1/1975 | Japan. |
| 54-136318 | 10/1979 | Japan. |
| 59-189354 | 10/1984 | Japan. |
| 63-72526 | 4/1988 | Japan. |
| 2-78531 | 3/1990 | Japan. |
| 3-89349 | 4/1991 | Japan. |
| 90/03893 | 4/1990 | WIPO. |

OTHER PUBLICATIONS

Brent Backhaus; "Saving Time, Money and Resources"; Nov., 1991; *Agricultural Engineering*.

*Primary Examiner*—James Sells
*Attorney, Agent, or Firm*—Hickman Beyer & Weaver

[57] ABSTRACT

A first plastic film 90 is prepared which is cut into an effective area V1 constituting a three-dimensional object and a non-required area U1 not constituting the three-dimensional object, and a second plastic film 94 is fed above the first plastic film 90. Meanwhile, a photo-setting adhesive 96 is applied on a lower surface of the second plastic film 94, and a portion 96a corresponding to a sum of the non-required area U1 of the first plastic film and a non-required area U2 of the second plastic film is solidified whereas a residual portion 96b remains non-solid. The non-solid portion 96b is irradiated with a light beam and solidified to attach the first and the second plastic films with each other. The second plastic film 94 is then cut into an effective area V2 and the non-required area U2. The three-dimensional object is formed by successively laminating plastic films through repetition of the above steps.

10 Claims, 28 Drawing Sheets

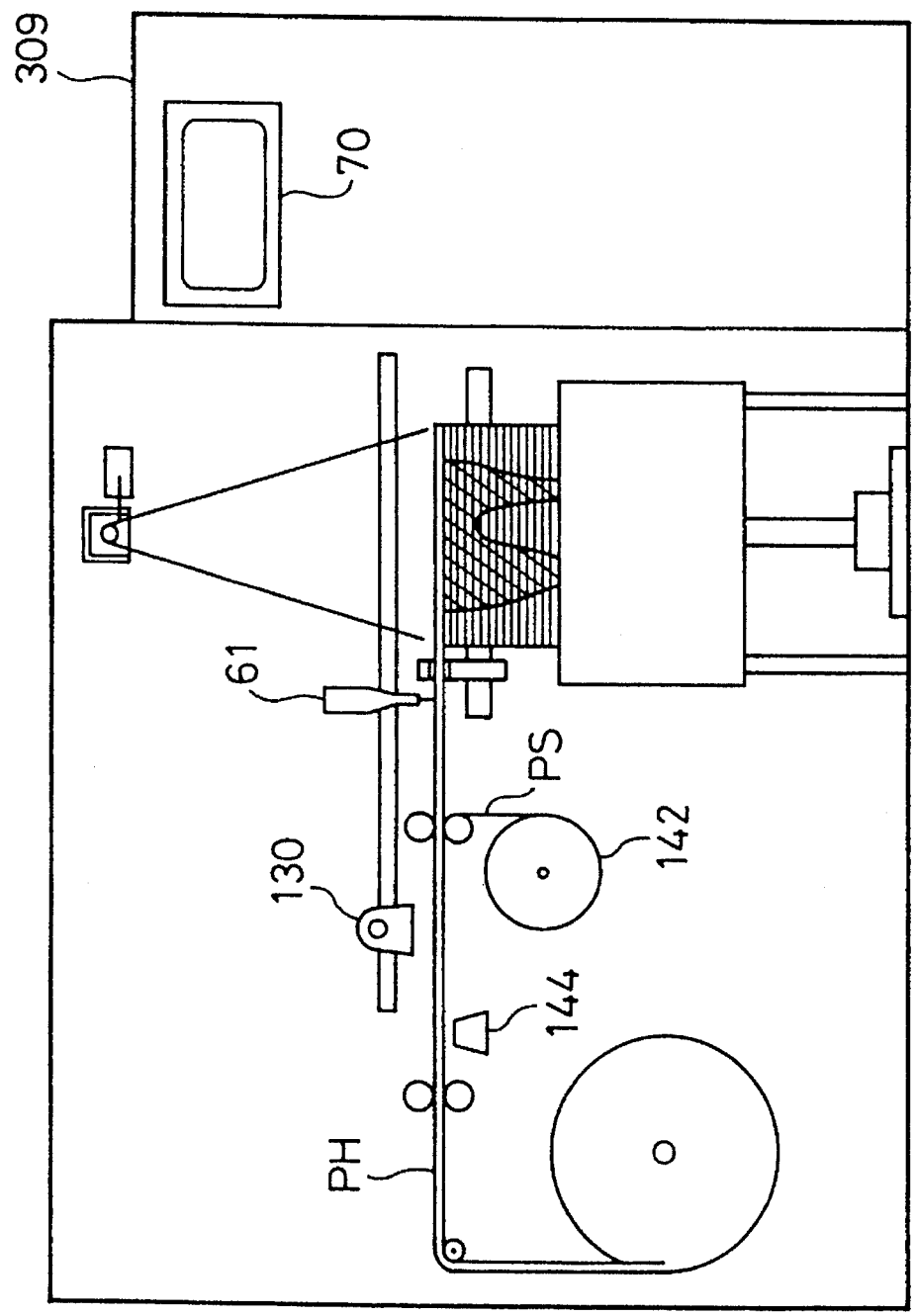

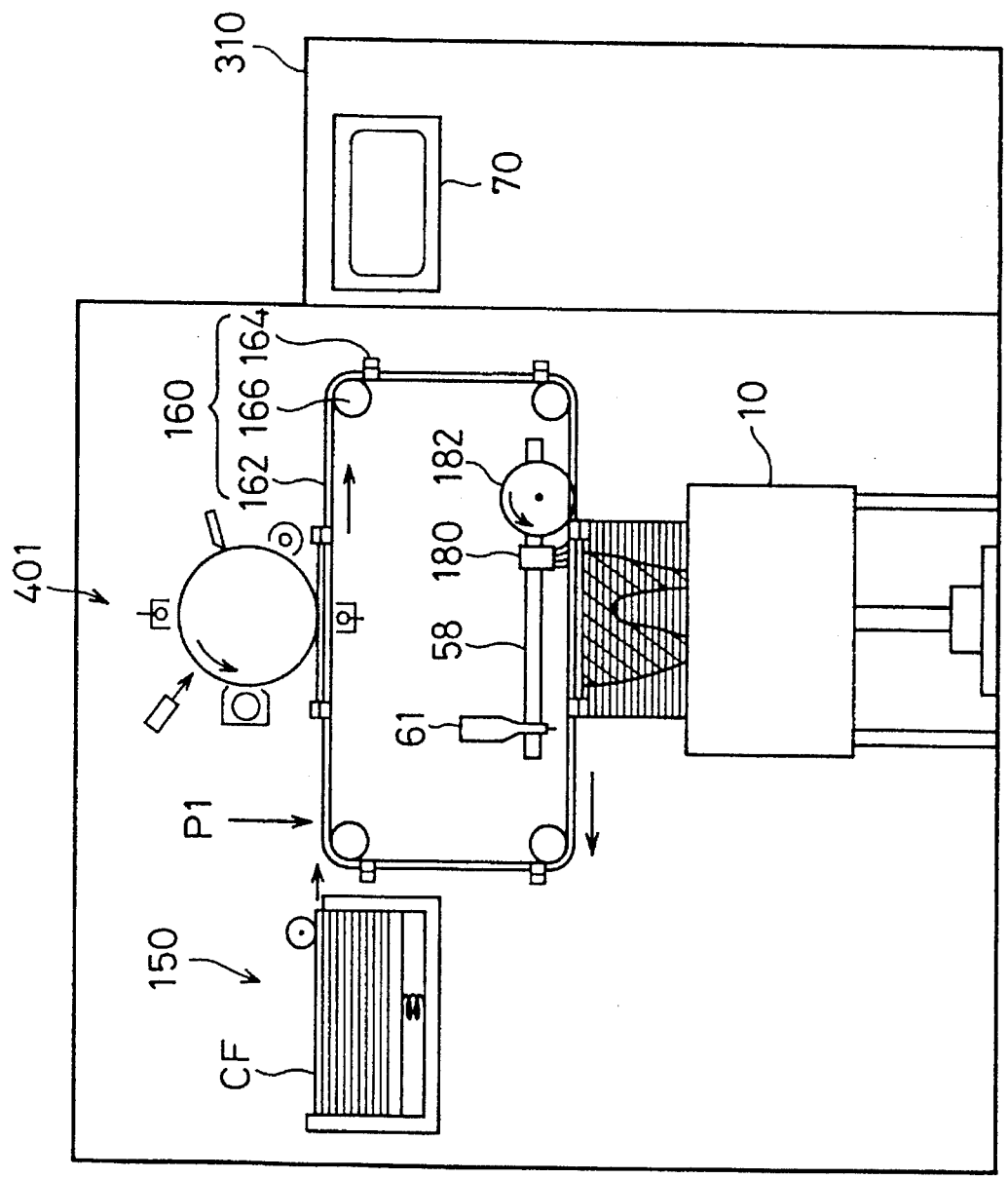

METHOD AND APPARATUS FOR MANUFACTURING A SOLID OBJECT THROUGH SHEET LAMINATING

INDUSTRIAL FIELD

The present invention relates to a method of forming a three-dimensional object through a sheet laminating process, and also to an apparatus for the same.

PRIOR ART

Apparatus for forming a three-dimensional object of a complicated shape have been disclosed in U.S. Pat. Nos. 4,961,154 and 5,031,120 by Pomerantz et al.

However, the kinds of materials that can be used in the conventional apparatus are limited, and it is impossible to form a three-dimensional object by laminating sheets of a desirable material.

An object of the present invention is accordingly to provide a method of forming a three-dimensional object with various kinds of sheet materials and an apparatus for the same.

DISCLOSURE OF THE INVENTION

The present invention is directed to a method of forming a three-dimensional object by laminating sheet members, comprising the steps of: (A) preparing a first sheet member, which is cut into an effective area constituting the three-dimensional object and a non-required area not constituting the three-dimensional object; (B) feeding a second sheet member above the first sheet member while interposing a non-solid adhesive layer between the first and second sheet members, the adhesive layer being formed in at least part of an area which is included in both of the effective area of the first sheet member and an effective area of the second sheet member; (C) attaching the first and second sheet members with each other by the adhesive layer; (D) cutting the second sheet member into the effective area and a non-required area; and (E) successively laminating sheet members through repetition of the steps (B) through (D) to form the three-dimensional object.

Through the steps (B) and (C), the effective areas of the first and second sheet members are attached with each other by an adhesive. In the subsequent step (D) where the second sheet member is cut into the effective area and a non-required area, the effective area of the second sheet member is separated from the non-required area of the second sheet member while being attached with the effective area of the first sheet member. A three-dimensional object constituted by laminating the effective areas can thus be produced by repeating the above steps.

Preferably, the adhesive is a powdery adhesive, and the step (B) comprises a step of depositing the powdery adhesive onto at least one of opposed surfaces of the first and second sheet members.

According to a preferred embodiment, the step (C) comprises a step of heating and pressing down the first and second sheet members by heating-pressing means to melt the powdery adhesive, thereby attaching the first and second sheet members with each other by the powdery adhesive.

The present invention is also directed to an apparatus for forming a three-dimensional object by laminating sheet members, comprising: a table vertically movable for holding a laminated object formed by laminating sheet members, each sheet member being cut into an effective area constituting the three-dimensional object and a non-required area not constituting the three-dimensional object; deposition means for depositing a powdery adhesive onto at least one of an upper surface of a first sheet member positioned uppermost on the laminated object and a lower surface of a second sheet member to be laminated on the first sheet member, the powdery adhesive being deposited in at least part of an area included in both of an effective area of the first sheet member and an effective area of the second sheet member; sheet feeding means for feeding and placing the second sheet member of a predetermined length onto the first sheet member; attaching means for attaching the first and second sheet members with each other by the powdery adhesive at least by applying a pressure onto the second sheet member; and cutting means for cutting the second sheet member into the effective area and a non-required area.

Preferably, the first and second sheet members are paper sheets which are cut in advance by the predetermined length.

According to a preferred embodiment, the attaching means comprises means for melting the powdery adhesive by applying heat and pressure onto the first and second sheet members, to thereby attach the first and second sheet members with each other via the powdery adhesive.

The present invention is further directed to a method of forming a three-dimensional object by laminating sheet members, comprising the steps of: effective area constituting the three-dimensional object and a non-required area not constituting the three-dimensional object; (B) feeding a second sheet member above the first sheet member while interposing a non-solid photo-setting adhesive layer between the first and second sheet members, the adhesive layer being formed in at least part of an area which is included in both of the effective area of the first sheet member and an effective area of the second sheet member; (C) irradiating the photo-setting adhesive layer with a predetermined light beam to solidify the photo-setting adhesive layer, to thereby attach the first and second sheet members with each other by the photo-setting adhesive layer; (D) cutting the second sheet member into the effective area and a non-required area; and (E) successively laminating sheet members through repetition of the steps (B) through (D) to form the three-dimensional object.

The present invention is still further directed to an apparatus for forming a three-dimensional object by laminating sheet members, comprising: a table vertically movable for holding a laminated object formed by laminating sheet members, each sheet member being cut into an effective area constituting the three-dimensional object and a non-required area not constituting the three-dimensional object; sheet feeding means for feeding the sheet members of a predetermined length towards the table; application means for applying a photo-setting adhesive over an area of the predetermined length on a lower surface of a first sheet member supplied from the sheet feeding means; irradiation means for selectively irradiating the photo-setting adhesive applied on the first sheet member with a predetermined light beam to solidify a part of the photo-setting adhesive applied on a sum of a non-required area of a second sheet member positioned uppermost on the laminated object and a non-required area of the first sheet member; attaching means for pressing the first sheet member towards the second sheet member via the photo-setting adhesive and irradiating a non-solid portion of the photo-setting adhesive with a predetermined light beam, to thereby solidify the non-solid portion to attach the first and second sheet members with each other by the photo-setting adhesive; and cutting means for cutting the first sheet member and the solid photo-setting adhesive into an effective area and a non-required area.

The present invention is further directed to an apparatus for forming a three-dimensional object by laminating sheet members, comprising: a table vertically movable for holding a laminated object formed by laminating sheet members, each sheet member being cut into an effective area constituting the three-dimensional object and a non-required area not constituting the three-dimensional object; application means for applying a photo-setting adhesive onto at least one of an upper surface of a first sheet member positioned uppermost on the laminate and a lower surface of a second sheet member laminated on the first sheet member, the photo-setting adhesive being applied in at least part of an area which is included in both an effective area of the first sheet member and an effective area of the second sheet member; sheet feeding means for feeding and placing the second sheet member of a predetermined length onto the first sheet member; attaching means for irradiating the photo-setting adhesive with a predetermined light beam, to thereby solidify the photo-setting adhesive to attach the first and second sheet members with each other by the photo-setting adhesive; and cutting means for cutting the second sheet member into the effective area and a non-required area.

The present invention is further directed to an apparatus for forming a three-dimensional object by laminating sheet members, the apparatus comprising: a table vertically movable for holding a laminated object formed by laminating sheet members, each sheet member being cut into an effective area constituting the three-dimensional object and a non-required area not constituting the three-dimensional object; sheet feeding means for feeding a three-layered sheet member of a predetermined length towards the table, the three-layered sheet member comprising a first sheet member, a cover sheet, and an adhesive layer interposed between the first sheet member and the cover sheet; solidifying means for selectively solidifying the adhesive layer of the three-layered sheet member supplied from the sheet supply means, the solidifying means solidifying a part of the adhesive layer corresponding to a sum of a non-required area of a second sheet member positioned uppermost on the laminate and a non-required area of the first sheet member; removal means for removing the cover sheet from the three-layered sheet member; attaching means for pressing the first sheet member of the layered sheet member without the cover sheet towards the second sheet member via the adhesive layer and solidifying a non-solid portion of the adhesive layer, to thereby attach the first and second sheet members with each other by the adhesive layer; and cutting means for cutting the first sheet member and the solid adhesive layer into an effective area and a non-required area.

These and other objects, features, aspects, and advantages of the present invention will become more apparent from the following detailed description of preferred embodiments with the accompanying drawings.

BRIEF DESCRIPTION OF THE DRAWINGS

FIG. 21 is a view showing another solid model forming apparatus as a tenth embodiment according to the present invention;

FIG. 23 is a view showing a solid model forming apparatus as an eleventh embodiment according to the present invention;

BEST MODE FOR EMBODYING THE INVENTION

A. First Embodiment

Figure 1:
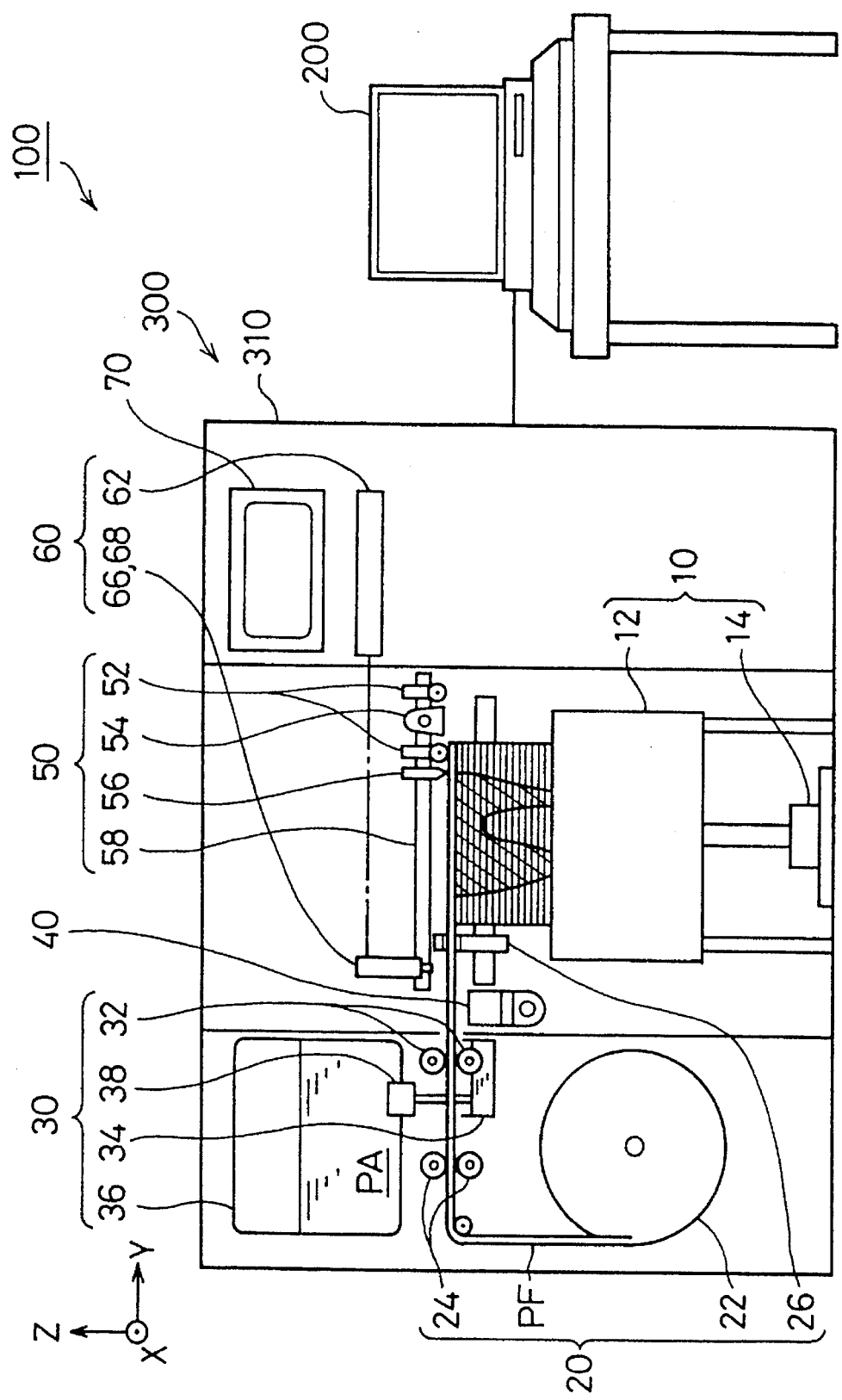
FIG. 1 is a view showing a laminated solid model forming system as a first embodiment according to the present invention.

FIG. 1 is a view showing a laminated solid model forming system 100 as a first embodiment according to the present invention. The laminated solid model forming system 100 includes a graphic work station 200 and a solid model forming apparatus 300.

The graphic work station 200 creates cross-sectional vector data representing cross sections of a three-dimensional object based on data representing the cross sectional shapes of the three-dimensional object, and supplies the cross-sectional vector data thus created to the laminated solid model forming system 100. A method of producing the data representing cross sections of a solid object based on CAD (computer-aided design) data is a known technique in the CAD field, and it is implemented, for example, by a plotting function of a Quantum1 System commercially available by Scitex Corp., Israel. A method of producing the data representing cross sections of a solid object and an apparatus for the same are disclosed in JAPANESE PATENT LAID-OPEN GAZETTE No. Sho-63-72526 and No. Hei-2-78531, and details are thereby not described here.

The solid model forming apparatus 300 comprises a plurality of sub-systems as follows:

(A) Table unit 10: The table unit 10 includes a table 12 on which a laminated solid model to be formed is mounted, and a motor 14 for moving the table 12 in a vertical direction. The table unit 10 further includes a position detector (not shown) for detecting an absolute vertical position of the table 12. The motor 14 moves down the table 12 by a thickness of a plastic film (more exactly, a total thickness of the film and an adhesive) every time when a plastic film is laminated.

(B) Film feeding unit 20: The film feeding unit 20 includes a film roll 22 comprising a roll of plastic film PF, a plurality Of guide rollers 24, and a holding/feeding mechanism 26 for holding an end of the plastic film PF and horizontally feeding a fixed length of the plastic film PF.

Figure 2:
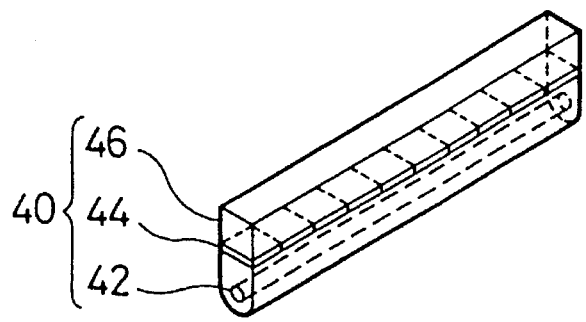
FIG. 2 is a perspective view showing the structure of a negative pattern exposure unit.

(C) Adhesive application unit 30: The adhesive application unit 30 includes a pair of application rollers 32, a tray 34 disposed below the pair of application rollers 32 for receiving a photo-setting adhesive PA, a tank 36 for storing the photo-setting adhesive PA, and a feeding pump 38 for transferring the photo-setting adhesive PA by small portions from the tank 36 to the tray (D) Negative pattern exposure unit 40: The negative pattern exposure unit 40 exposes a part of the photo-setting adhesive PA applied on a lower surface of the plastic film PF to solidify. The negative pattern exposure unit 40 includes a linear light source 42, a linear liquid crystal shutter 44, and a linear lens array 46 shown in FIG. 2. The linear light source 42 emits a light beam of a specific wave length to solidify the photo-setting adhesive PA. The linear liquid crystal shutter 44 functions as a shutter for blocking the light beam from the linear light source 42 with respect to each small width, thereby transmitting the beam to expose specific areas to be solidified while preventing the beam from exposing the other areas not to be solidified. Alternatively, a scanning exposure unit for scanning a laser beam for exposure of a negative pattern can be used in place of the linear negative pattern exposure unit 40. Another scanning exposure unit for exposing a negative pattern can be used which comprises an array of light emitting elements such as LEDs and fluorescent tubes.

(E) Photo-setting attaching unit 50: The photo-setting attaching unit 50 includes a pressure roller 52 for pressing down the plastic film PF fed onto the table 12, a linear light source 54, and a gap sensor 56. These elements 52, 54, and 56 respectively move along a rail 58 laid in the horizontal direction.

Figure 3:
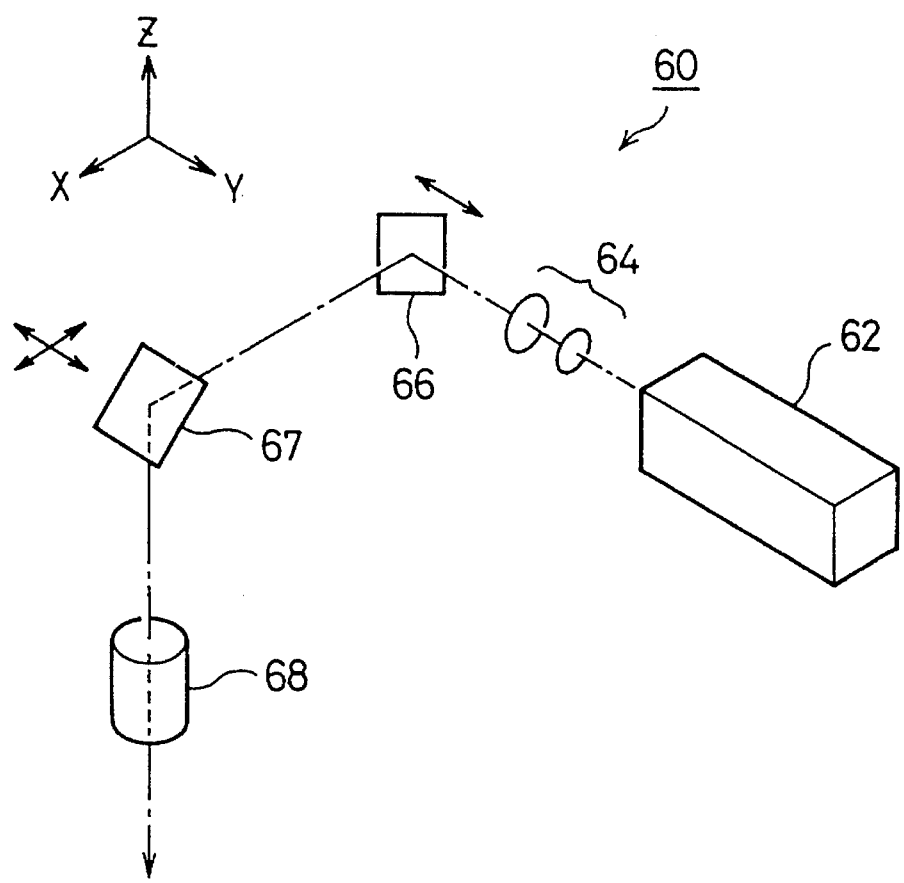
FIG. 3 is a conceptual perspective view illustrating the structure of a laser cutting unit.

(F) Laser cutting unit 60: The laser cutting unit 60 includes a $CO_2$ laser 62, a beam expander 64, a pair of reflecting mirrors 66 and 67, and a focusing unit 68 as shown in FIG. 3. The pair of reflecting mirrors 66 and 67, and the focusing unit 68 are engaged with a high precision X-Y table (not shown) to move in specific directions. The first reflecting mirror 67 moves in a Y-direction. The second reflecting mirror 67 and the focusing unit 68 simultaneously move in X- and Y-directions while keeping their relative positions. The $CO_2$ laser 62 is controlled by a pulse width control unit (not shown) to have a pulse width adjusted for equalizing energy per unit stroke according to the movement of the X-Y table. The laser cutting unit 60 functions to cut a rear end of the plastic film PF after being fed by a predetermined length, and to cut the upper-most plastic film into an effective area and a non-required area. In the description below, the plastic film cut to have a fixed length is referred to as "cut film".

(G) Data processing unit 70: The data processing unit 70 converts cross-sectional vector data of a three-dimensional object supplied from the graphic work station 200 to raster data, which represents a cross section of the three-dimensional object. One side of a contour of the cross section is an effective area constituting the three-dimensional object while the other side being a non-required area. Both of the cross-sectional vector data and the raster data are generated for each cut film. The raster data generated by the data processing unit 70 are subsequently given to the negative pattern exposure unit 40. The data processing unit 70 also functions to control each element in the solid model forming apparatus 300.

The whole solid model forming apparatus 300 is accommodated in a sealed casing 310 formed as a darkroom for preventing the photo-setting adhesive PA from setting with external light. The solid model forming apparatus 300 further includes an gas exhaust unit (not shown) for discharging the gas generated in the apparatus.

An example of the photo-setting adhesive PA is a visible ray-setting adhesive 'Arontite VL series' (trade name) manufactured by Toa Gosei Chemical Industry. Since this photo-setting adhesive sets by irradiation of visible rays for several tens of seconds, a blue fluorescent lamp or a metal halide lamp can be used as the linear light sources 42 and 54. Another example of the photo-setting adhesive which sets with ultraviolet rays includes 'V1003' and 'UV1006' (trade names) manufactured by Sony Chemical Corp.

The plastic film PF can be composed of any plastic material which absorbs a laser beam emitted from the $CO_2$ laser 62 for cutting the plastic film PF while not absorbing rays used for setting the photo-setting adhesive PA. Examples of such material include polycarbonate, ABS resin, and other engineering plastics. A non-plastic material, such as a translucent (semi-transparent) alumina sheet, can also be used in place of the plastic film PF. The alumina sheet gives a sufficiently high strength to the solid object manufactured. The kinds of sheets which do not absorb a laser beam are cut by another cutting means, for example, an ultrasonic cutter (described later).

FIG. 4 shows a process of manufacturing a three-dimensional object with the laminated solid model forming system 100. FIG. 4(A) shows an uppermost cut film 90 and an adhesive layer 92 formed on a lower surface of the cut film 90, which are mounted on the table 12. The adhesive layer 92 is formed by setting the photo-setting adhesive PA. The cut film 90 and the adhesive layer 92 are cut into an effective area V1 and a non-required area U1 by the laser cutting unit 60.

Figure 4A:
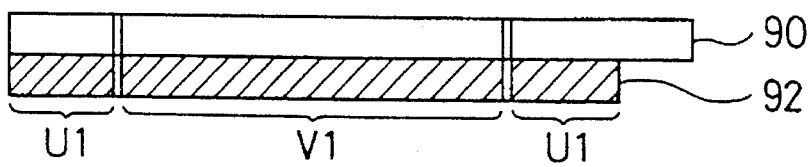
FIGS. 4(A) through 4(E) are cross sectional views showing a process of manufacturing a three-dimensional object in the first embodiment.
Figure 4B:
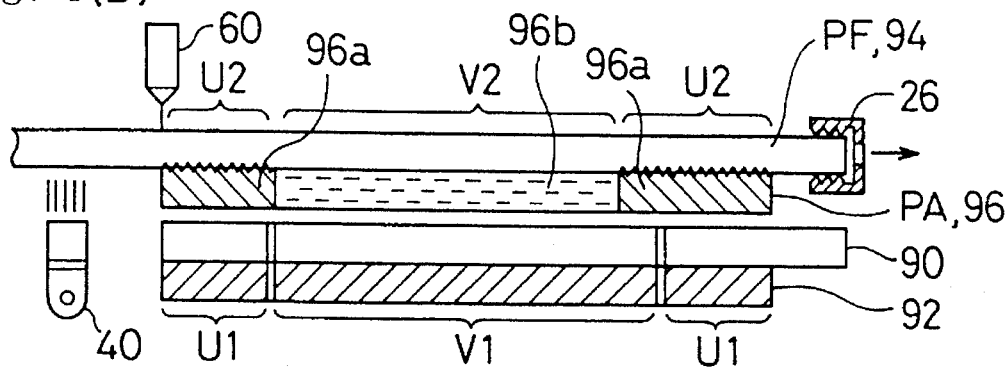

In the process of FIG. 4(B), a new feed of the plastic film PF is held by the holding/feeding mechanism 26 and brought above the uppermost cut film 90 on the table 12. The newly fed plastic film PF is cut at a fixed length by the laser cutting unit 60 to make a new cut film 94. In the course of transportation, the photo-setting adhesive PA is uniformly applied on a lower surface of the newly fed plastic film PF with the pair of application rollers 32 (see FIG. 1), thereby forming a new adhesive layer 96. The preferable thickness of the adhesive layer 96 is in the range of about 5 to 25 μm, and the thinner adhesive layer 96 gives stronger adhesiveness. The preferable thickness of the plastic film PF is in the range of about 50 μm through 0.1 mm. In the drawings of FIG. 4, the thickness of each layer is exaggerated for clarity of illustration.

In the process of FIG. 4(B), the negative pattern exposure unit 40 exposes part of the adhesive layer 96 to form a solid portion 96a and a non-solid portion 96b. The solid portion 96a is the area which is included in at least one of the non-required area U1 of the lower cut film 90 and another non-required area U2 of the upper film PF. In other words, the solid portion 96a is a logical sum (OR) of the two non-required areas U1 and U2. On the other hand, the non-solid portion 96b is the area which is included in both of the effective areas V1 and V2, or a logical product (AND) of the two effective areas V1 and V2.

The non-solid portion 96b can be smaller than the logical product of the effective areas V1 and V2 as long as it is totally included in the area of the logical product. The non-solid portion 96b can be extended to an area which is included in both of the non-required areas U1 and U2 (that is, a logical product of the non-required areas U1 and U2). In other words, the non-solid portion 96b can be determined so that it is in a logical product (AND) of the effective areas V1 and V2 and not in an exclusive logical sum (EXOR) of the effective areas V1 and V1. In place of applying the photo-setting adhesive PA uniformly onto the lower surface of the plastic film PF in this embodiment, the photo-setting adhesive PA can selectively be applied on at least part of the logical product of the effective areas V1 and V2 and at least part of the logical product of the non-required areas U1 and U2.

Figure 5:
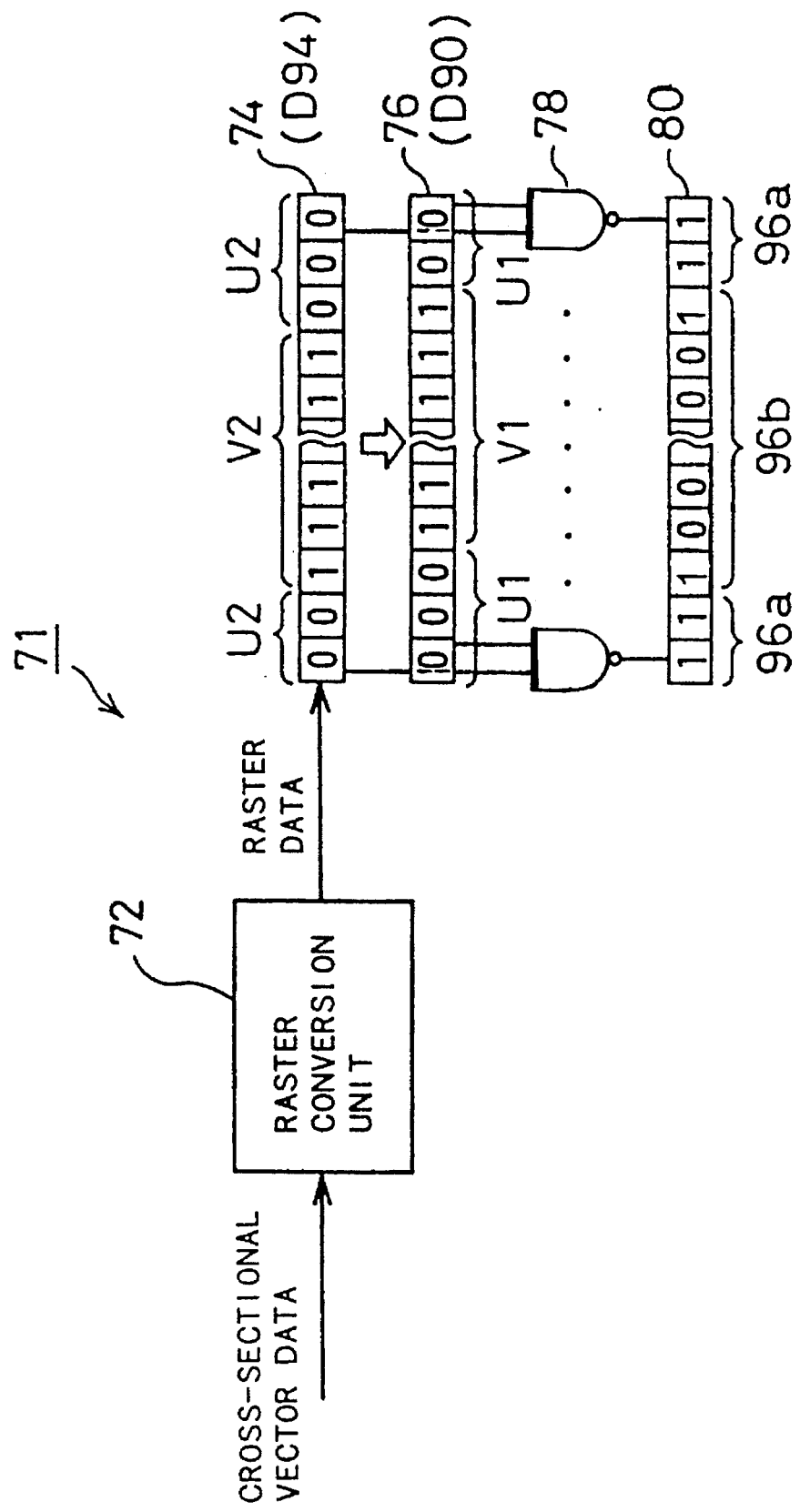
FIG. 5 is a block diagram showing the structure of a negative pattern generating unit.

In the exposure process of FIG. 4(B), data representing the solid portion 96a are supplied from the data processing unit 70 to the negative pattern exposure unit 40, which executes the exposure process based on the data supplied. FIG. 5 is a block diagram showing the structure of a negative pattern generation unit 71 in the data processing unit 70. The negative pattern generation unit 71 comprises a raster conversion unit 72 for converting cross-sectional vector data to raster data, first and second registers 74 and 76 for storing raster data thus converted, NAND circuits 78 for executing NAND operation of the data in the two registers 74 and 76, and a third register 80 for storing an output of the NAND circuit. In the state of FIG. 4(B), the first register 74 stores raster data D94 for the upper cut film 94 while the second register 74 stores raster data D90 for the lower cut film 90. Every pair of corresponding bits of the data in the first and second registers 74 and 76 are input into the NAND circuits 78, and the third register 80 stores results of the NAND operation. The raster data D90 and D94 have the value '1' for pixels in the effective areas V1 and V2 and the value '0' for pixels in the non-required areas U1 and U2. The data in the third register 80, which are the NAND of the raster data D90 and D94, have the value '1' for the pixels which are included in at least one of the two non-required areas U1 and U2, and the value '0' for the pixels which are included in both of the two effective areas V1 and V2.

As the exposure process is executed according to the raster data stored in the third register 80, the part of the adhesive layer 96 which has the value '1' in the third register 80 is exposed to become the solid portion 96a whereas the residual part having the value '0' is not exposed to become the non-solid portion 96b. The solid portion 96a of the adhesive layer 96 is attached with the upper cut film 94 at their interface shown by the jagged lines in FIG. 4(B).

Figure 4C:
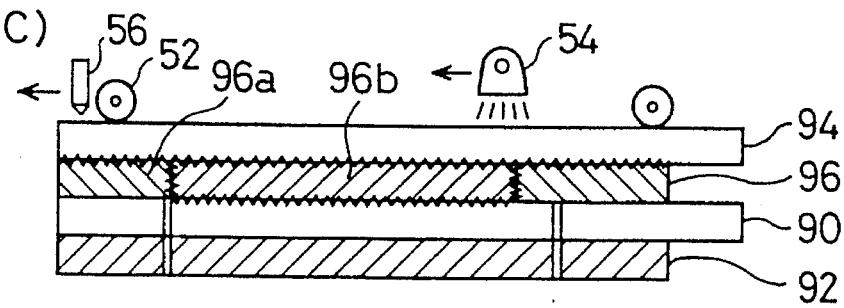

In the process of FIG. 4(C), the pressure roller 52 moves horizontally and presses down the newly fed cut film 94 so as to bring the cut film 94 and the adhesive layer 96 into close contact with the uppermost cut film 92 on the table 12. The gap sensor 56 measures a gap between the gap sensor 56 and the plane of the cut film 94, and the height of the table 12 is adjusted to make the gap constant. The constant gap assures accurate control of the total thickness of the film and the adhesive layer, and allows the laser cutting unit 60 to cut the film precisely in the subsequent process described below. The linear light source 54 emits solidifying light while moving along the whole surface of the cut film to solidify the non-solid portion 96b of the adhesive layer 96. The new solid portion 96b of the adhesive layer 96 is consequently attached with the surrounding solid portion 96a and the cut film 94 on their interface as shown by the jagged lines in FIG. 4(C).

Figure 4D:
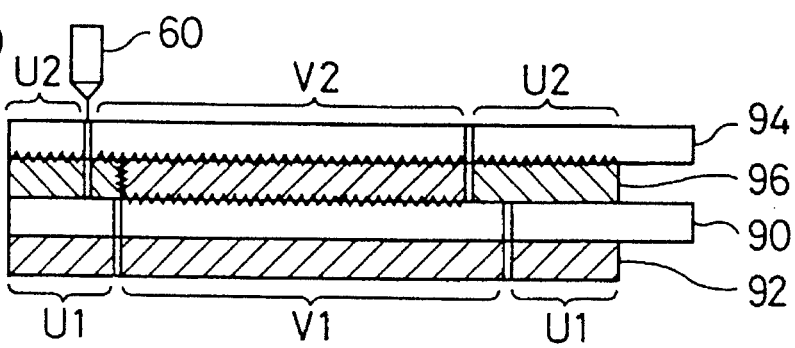
Figure 4E:
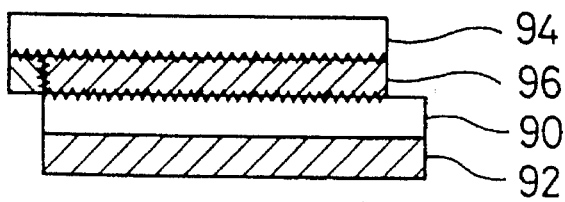

In the process of FIG. 4(D), the laser cutting unit 60 cuts the uppermost cut film 94 and the adhesive layer 96 along the contour of the cross section of a three-dimensional object and divides the cut film 94 and the adhesive layer 96 into the effective area V2 and the non-required area U2. Raster data representing the effective area V2 of the cut film 94 are supplied from the data processing unit 70 to the laser cutting unit 60, which executes the cutting along the boundary between the effective area V2 and the non-required area U2 expressed by the raster data. Power of the laser cutting unit 60 is regulated so as not to cut the lower cut film 90. The effective area V1 of the lower cut film 90 and the effective area V2 of the upper cut film 94 are attached with each other via the adhesive layer 96. On the other hand, the non-required area U1 of the lower layer and the non-required area U2 of the upper layer are separated from the effective areas V1 and V2. Removal of the non-required areas makes the three-dimensional object constituted only by the effective areas as shown in FIG. 4(E).

In the process of FIG. 4(D), the non-required area U2 of the cut film 94 and the adhesive layer 96 is further cut into rectangular blocks for easy removal of the non-required area. The table 12 is then descended by the total thickness of the cut film and the adhesive layer, and waits for supply of a next cut film.

The state of FIG. 4(D) is equivalent to that of FIG. 4(A). Therefore, by repeating the process of FIGS. 4(B) through 4(D), the effective areas are laminated to make a three-dimensional object having a desired shape.

After completion of the lamination process, the non-required areas are removed to obtain the final three-dimensional object. Since the non-required areas U1 and U2 do not adhere to the effective areas V1 and V2 as shown in FIG. 4(D), they are easily removed from the effective areas V1 and V2. Heat treatment of the three-dimensional object thus obtained further enhances the adhesive strength in the final object.

In the first embodiment described above, various kinds of materials can be used for the plastic film PF, and an appropriate material can be thereby selected for the plastic film PF according to the purpose of the final three-dimensional object. Especially, transparent or translucent plastic materials will make translucent three-dimensional objects. Since plastic films securely adhere to each other via an adhesive whereas non-required areas do not adhere to effective areas of the plastic films, this method can easily manufacture a three-dimensional object having a complicated shape without causing undesirable peel-off, compared with the conventional method of laminating paper sheets.

B. Second Embodiment

Figure 6:
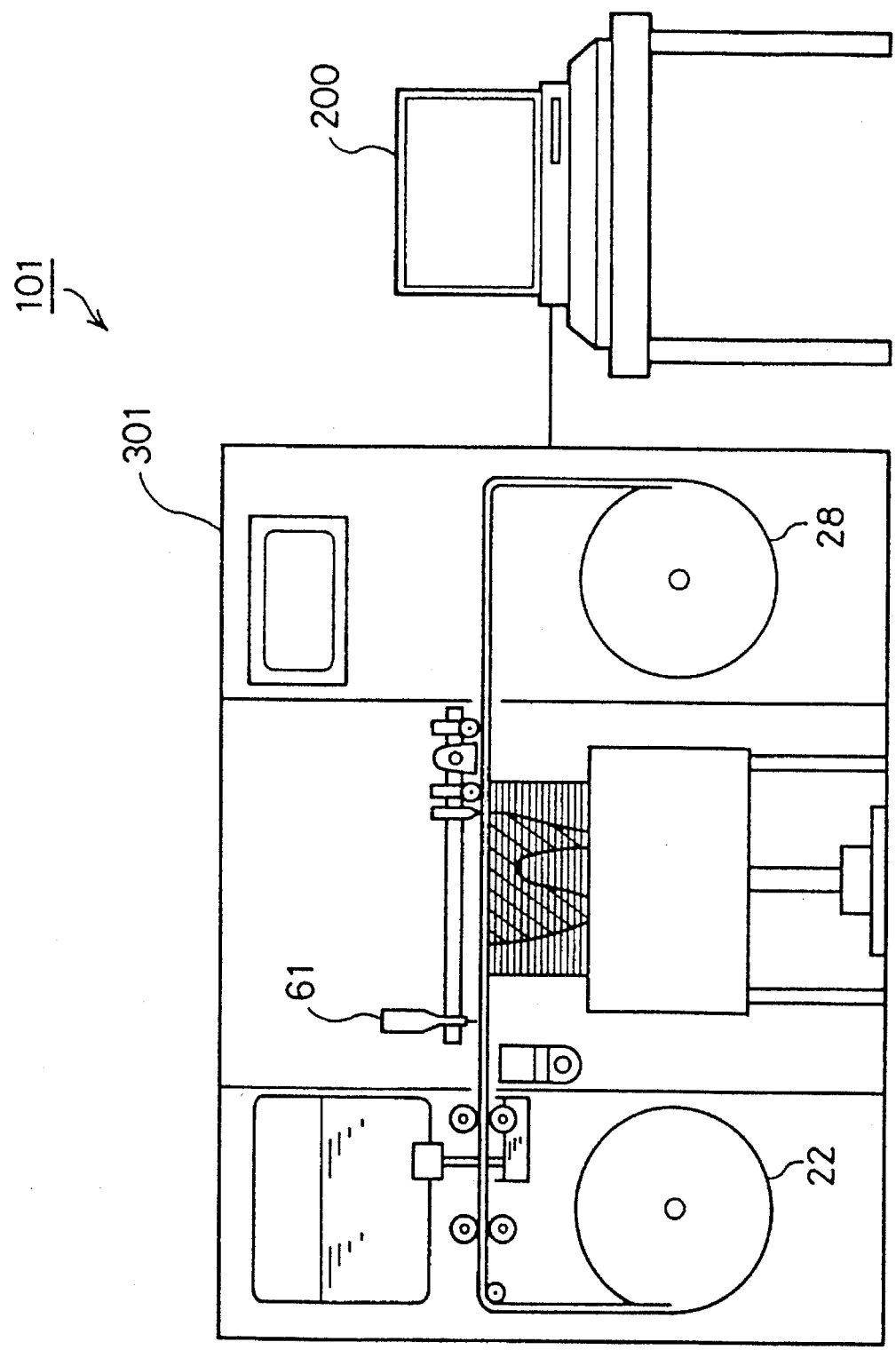
FIG. 6 is a view showing another laminated solid model forming system as a second embodiment according to the present invention.

FIG. 6 is a view showing another laminated solid model forming system 101 as a second embodiment according to the present invention. A model forming apparatus 301 of the laminated solid model forming system 101 has similar elements to those of the solid model forming apparatus 300 of the first embodiment shown in FIG. 1, except a winding roll 28 instead of the holding/feeding mechanism 26 and an ultrasonic cutter 61 in place of the laser cutting unit 60. The ultrasonic cutter 61 is means for cutting films two-dimensionally in the same manner as the laser cutting unit 60.

Figure 7:
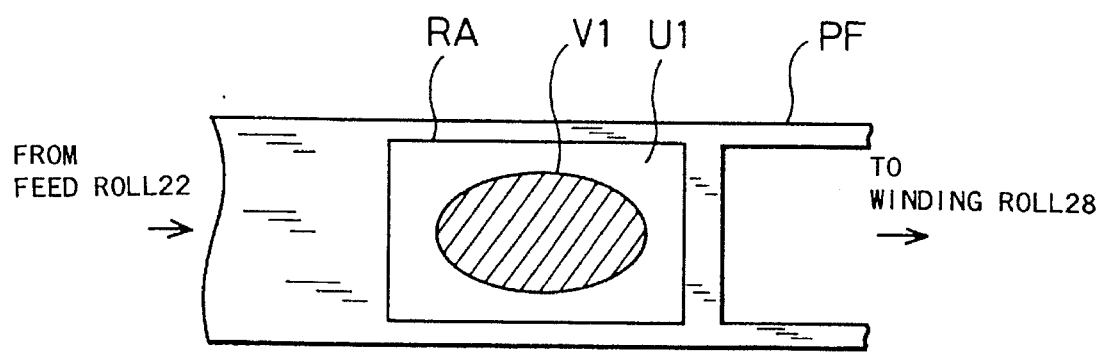
FIG. 7 is a plan view showing a plastic film partly cut out in the second embodiment.

The laminated solid model forming system 101 does not cut the whole width of the plastic film PF but winds the long film having a cut-out part on the winding roll 28. FIG. 7 is a plan view showing the plastic film PF partly cut out. After the uppermost film 94 and the adhesive layer 96 immediately below the film 94 are cut into the effective area V2 and the non-required area U2 in the process of FIG. 4(D), a rectangular area RA surrounding the non-required area U2 is further cut out as shown in FIG. 7. This separates the rectangular area RA from the plastic film PF. The plastic film PF without the rectangular cut-out part is transported towards the winding roll 28 for the lamination of a next film layer.

The ultrasonic cutter 61 in the second embodiment can be used even in inflammable circumstances and is lower in cost than a laser. An example of the ultrasonic cutter 61 is SUW-30 (trade name) manufactured by Suzuki Corp. The laser is, on the other hand, suitable for fine cutting work.

C. Third Embodiment

Figure 8:
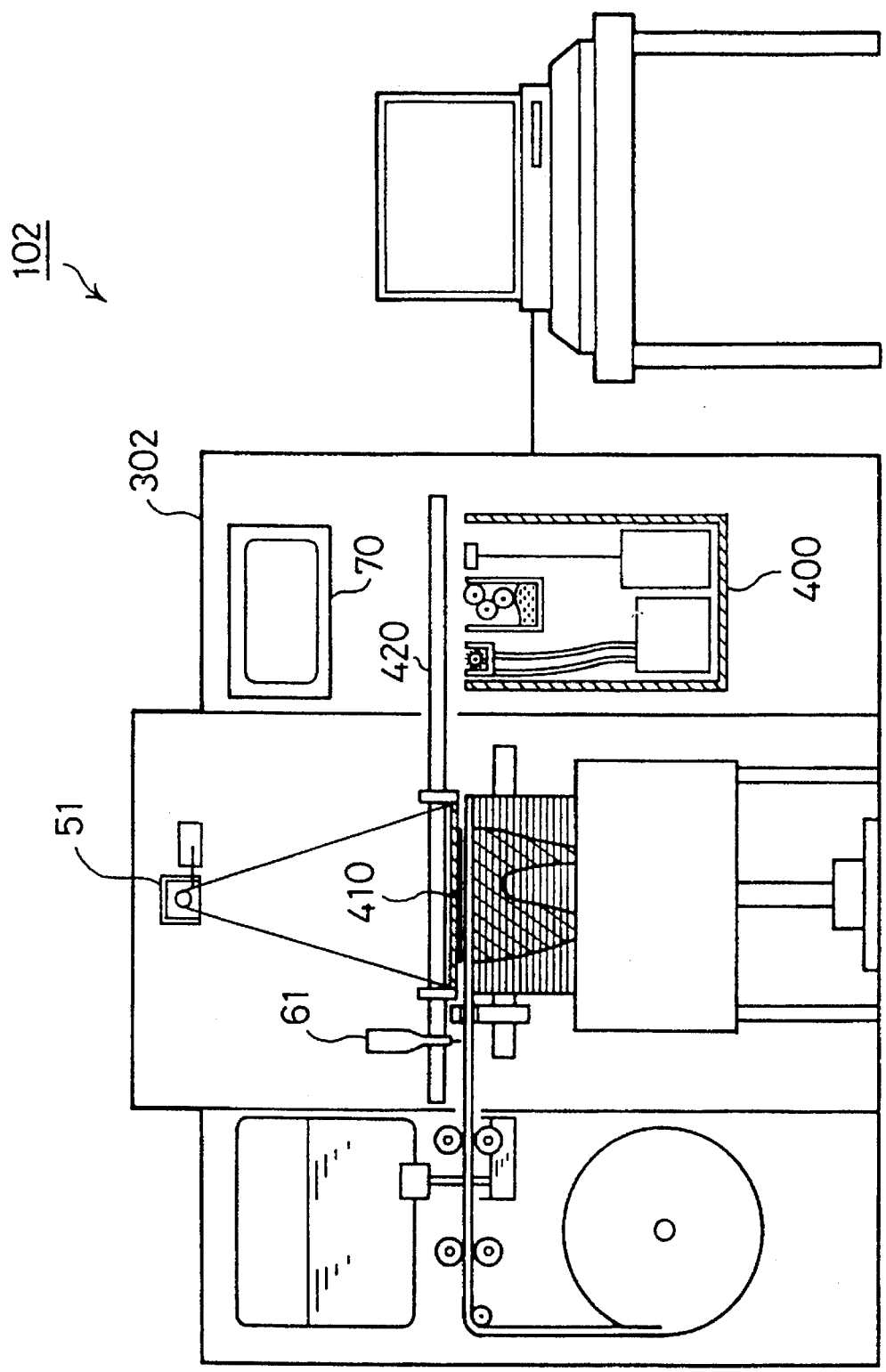
FIG. 8 is a view showing still another laminated solid model forming system as a third embodiment according to the present invention.

FIG. 8 is a view showing still another laminated solid model forming system 102 as a third embodiment according to the present invention. A model forming apparatus 302 of the laminated solid model forming system 102 includes the ultrasonic cutter 61 in place of the laser cutting unit 60 used in the solid model forming apparatus 300 of the first embodiment shown in FIG. 1, and an ultraviolet ray exposure unit 51 instead of the negative pattern exposure unit 40 and the linear light source 54 of the photo-setting attaching unit 50. The model forming apparatus 302 further includes a mask preparation unit 400 for preparing an optical mask 410. The roller 52 and the gap sensor 56 are in waiting positions and omitted from the illustration of FIG. 8.

The mask preparation unit 400 prepares a mask part of the optical mask 410 by electrophotographic technique. A mask generating sub-system (502) illustrated in FIG. 22 of JAPANESE PATENT LAID-OPEN GAZETTE No. Hei-2-78531 can be used as the mask preparation unit 400.

The mask preparation unit 400 generates the optical mask 410 based on the raster data supplied from the data processing unit 70. The optical mask 410 includes a light-screening mask layer formed on a lower surface of a glass base, where the residual part of the optical mask 410 other than the mask layer transmits ultraviolet rays. A laminate which is to be discolored by heat as described in JAPANESE PATENT LAID-OPEN GAZETTE No. Sho-54-136318 can be used as the optical mask. In this case, the mask layer is heated, for example, with a thermal head.

In manufacturing a three-dimensional object with the laminated solid model forming system 102, the optical mask 410 moves along a rail 420 to be positioned above the film 94 in the process of FIG. 4(B), and the ultraviolet ray exposure unit 51 emits ultraviolet rays through the optical mask 410 to solidify only the non-required area U1. In the subsequent process of FIG. 4(C), the whole surface of the film 94 is irradiated with ultraviolet rays emitted from the ultraviolet ray exposure unit 51 without the optical mask 410.

Since the whole film surface is exposed simultaneously to ultraviolet rays of a relatively high energy level in the third embodiment, and its processing time is shorter than the first and the second embodiments. The first and the second embodiments, on the other hand, use a relatively inexpensive light source and do not require the mask preparation unit 400, thus being manufactured at relatively low cost. If visible ray-setting adhesives (for example, 'Arontite VL series') are used in this and any of the following embodiments, they can be solidified with visible rays, instead of ultraviolet rays.

D. Fourth Embodiment

Figure 9:
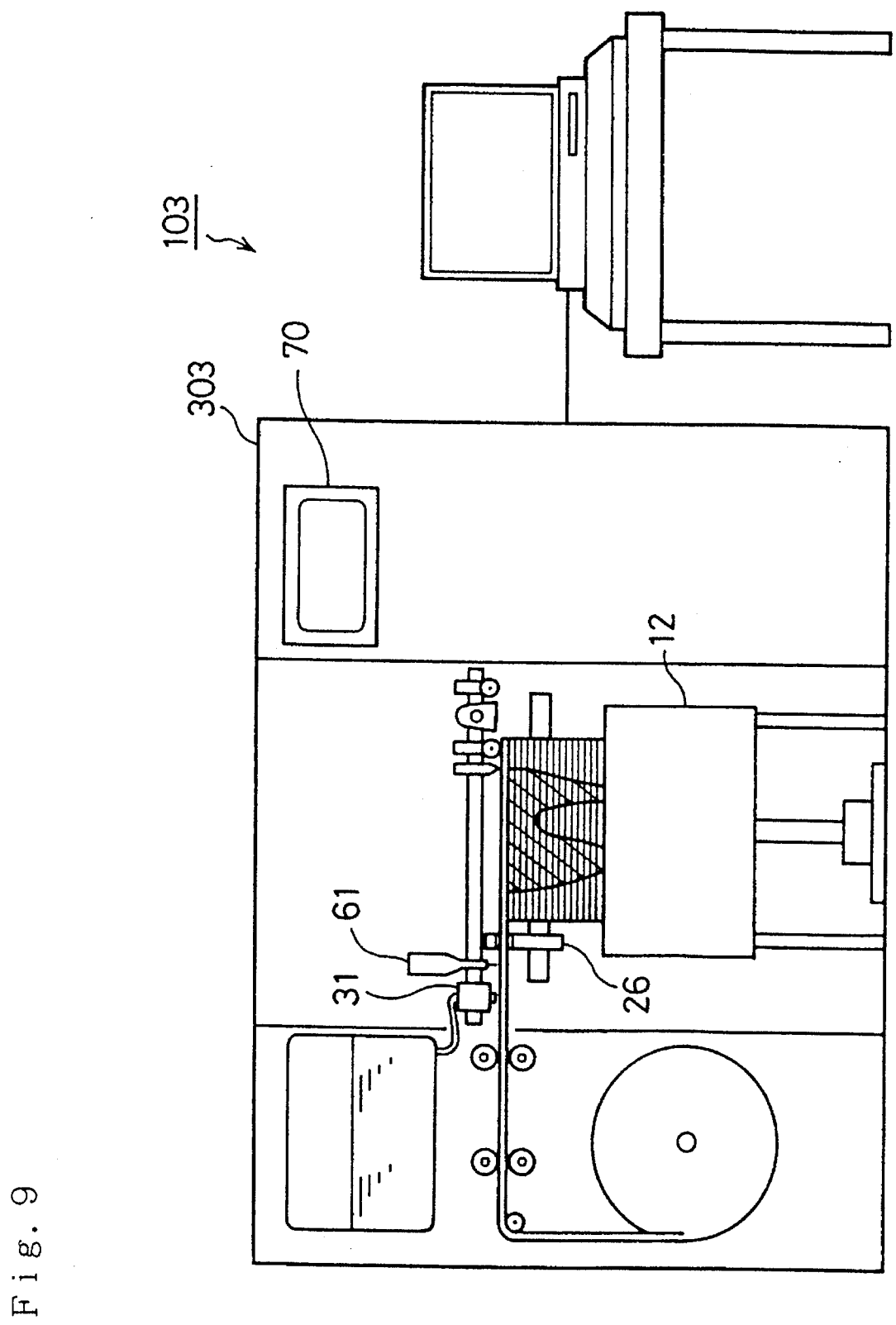
FIG. 9 is a view showing another laminated solid model forming system as a third embodiment according to the present invention.

While the photo-setting adhesive PA is applied on the lower surface of the plastic film PF in any system of the first through the third embodiments, the laminated solid model forming system 103 shown in FIG. 9 applies the photo-setting adhesive PA on the upper surface of the plastic film PF.

A model forming apparatus 303 of the laminated solid model forming system 103 includes a liquid jet unit 31 instead of the tray 34 and the feeding pump 38 of the model forming apparatus 300 shown in FIG. 1, and the ultrasonic cutter 61 in place of the laser cutting unit 60. The model forming apparatus 303 does not require the negative pattern exposure unit 40. The liquid jet unit 31, which has a structure similar to those of ink jet printers and bubble jet printers used in computer systems, jets the photo-setting adhesive PA according to the raster data supplied from the data processing unit 70.

FIG. 10 shows a process of manufacturing a three-dimensional object with the laminated solid model forming system 103. FIG. 10(A) shows an uppermost cut film 110 mounted on the table 12. The cut film 110 is cut into an effective area V1 and a non-required area U1.

Figure 10A:
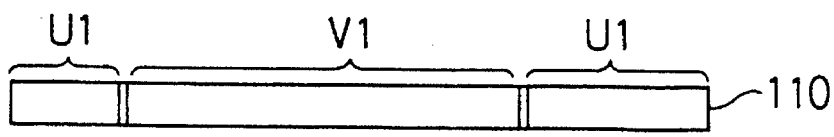
FIGS. 10(A) through 10(E) are cross sectional views showing a process of manufacturing a three-dimensional object in the fourth embodiment.
Figure 10B:
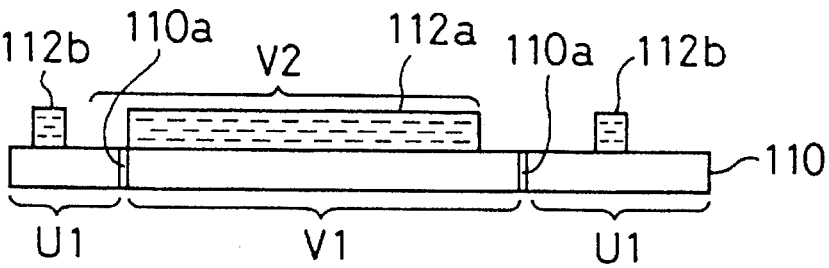

In the process of FIG. 10(B), the photo-setting adhesive PA is applied onto the cut film 110 to form adhesive layers 112a and 112b by the liquid jet unit 31. The adhesive layer 112a is formed within an area which is included both in the effective area V1 of the cut film 110 and an effective area V2 of another film disposed above the cut film 110, that is, an area of logical product (AND) of the effective areas V1 and V2. The adhesive layer 112a can be formed a little inside a cut end 110a of the cut film 110 to prevent the photo-setting adhesive PA from permeating the cut end 110a of the cut film 110. The surrounding adhesive layers 112b are spotted in an area which is included in both the non-required areas of the two films to support a new cut film disposed above the cut film 110. In general, the adhesive layers are not formed in a specific area where one of the two film layers is effective and the other is not required, that is, not in an area of exclusive logical sum of the two film layers.

Figure 11:
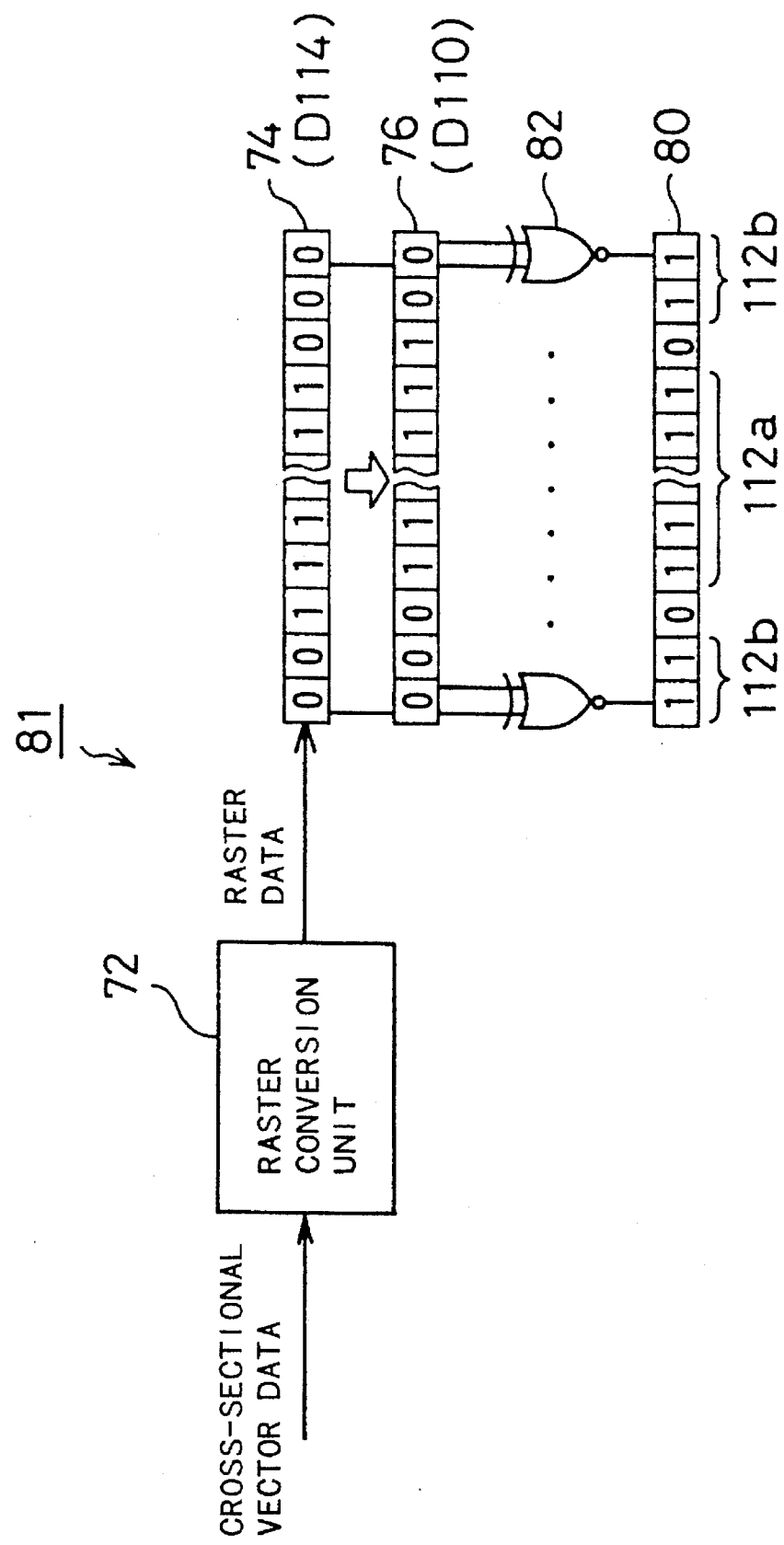
FIG. 11 is a block diagram showing a structure of an application pattern generating unit.

In the exposure process of FIG. 10(B), data representing the adhesive layers 112a and 112b are supplied from the data processing unit 70 to the liquid jet unit 31, which applies the photo-setting adhesive PA based on the data supplied. FIG. 11 is a block diagram showing the structure of an application pattern generation unit 81 in the data processing unit 70. The application pattern generation unit 81 includes EXNOR circuits 82 instead of the NAND circuits 78 of the negative pattern generation unit 71 shown in FIG. 5. In the state of FIG. 11(B), the first register 74 stores raster data D114 for an upper cut film 114 to be disposed as the upper film in the subsequent step while the second register 74 stores raster data D110 for the lower cut film 110. Every pair of corresponding bits of the data in the first and second registers 74 and 76 are input into the EXNOR circuits 82, and the third register 80 stores results of the EXNOR operation. The data in the third register 80, which are EXNOR of the raster data D110 and D114, have the value '1' for the pixels which are included in both of the two effective areas V1 and V2 or both of the two non-required areas U1 and U2, and the value '0' for the other pixels. As for the pixels corresponding to the non-required areas, skipped data of the value '1' can be used as data used for application of the adhesive.

The photo-setting adhesive PA is applied onto part of the cut film 110 which has the value '1' in the third register 80 to form the adhesive layers 112a and 112b.

Figure 10C:
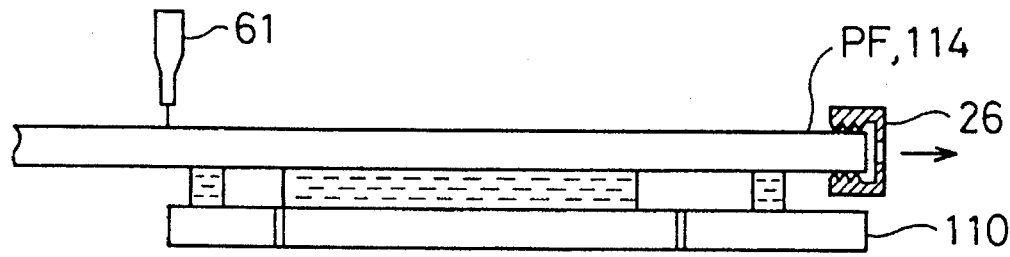

In the process of FIG. 10(C), a new feed of the plastic film PF is held and transported to above the table 12 with the holding/feeding mechanism 26, and placed on the cut film 110. The plastic film PF is then cut by a predetermined length with the ultrasonic cutter 61 to make the cut film 114.

Figure 10D:
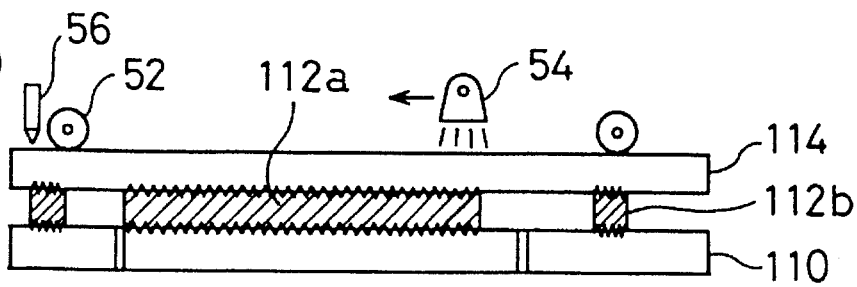

In the process of FIG. 10(D), the pressure roller 52 moves horizontally and presses down the newly fed cut film 114 so as to bring the cut film 114 and the adhesive layers 112a and 112b into close contact with the uppermost cut film 110 on the table 12. The pressure roller 52 adjusts the height of the cut film 114 to make the gap detected by the gap sensor 56 constant. The linear light source 54 subsequently moves and emits a light beam over the whole surface of the cut film 114 to solidify the adhesive layers 112a and 112b. The adhesive layers 112a and 112b are consequently attached with the lower and the upper cut films 110 and 114 on their interface as shown by the jagged lines in FIG. 10(E).

Figure 10E:
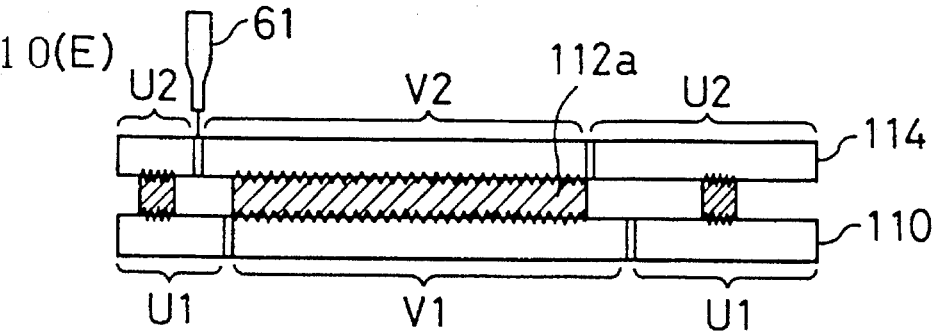

In the process of FIG. 10(E), the ultrasonic cutter 61 cuts the uppermost cut film 114 along the contour of the cross section of a three-dimensional object. Vector data representing the contour of the effective area V2 of the cut film 114 are supplied from the data processing unit 70 to the ultrasonic cutter 61, which executes cutting based on the vector data supplied. In FIG. 10(E), the effective area V1 of the lower cut film 110 and the effective area V2 of the upper cut film 114 are attached with each other via the adhesive layer 112a. On the other hand, the non-required area U1 of the lower layer and the non-required area U2 of the upper layer are separated from the effective areas V1 and V2. By removing the non-required areas, the three-dimensional object constituted by only the effective areas is obtained.

In the process of FIG. 10(E), the non-required area U2 of the cut film 114 is cut in meshes for easy removal of the non-required area. The table 12 is descended by the total thickness of a cut film and an adhesive layer and waits for supply of a next cut film. By repeating the process of FIGS. 10(B) through 10(E), effective areas are laminated to form a three-dimensional object of a desired shape.

Since the photo-setting adhesive PA is applied onto the upper surface of the plastic film PF in the fourth embodiment described above, it is easier to uniformly apply the photo-setting adhesive PA. In the first through the fourth embodiments, on the other hand, the photo-setting adhesive PA is applied on the whole surface of the plastic film PF, and this simplifies the application procedure and effectively prevents the non-solid photo-setting adhesive PA from permeating the cut end of the plastic film PF. Further, since the adhesive is applied onto the uppermost film of the laminated object, the positioning accuracy in the application process depends on the precision of an X-Y table used for positioning the liquid jet unit 31, and the adhesive can be applied on a desired position at a high precision accordingly.

In the structure of the fourth embodiment, a viscous photo-setting adhesive PA may clog the liquid jet unit 31. In this case, a printing application device according to intaglio printing can be used for applying the adhesive layer 112a on the effective area of the film in place of the liquid jet unit 31. An example of such printing application devices is described in JAPANESE PATENT LAID-OPEN GAZETTE No. Sho-50-1805. A method of applying the adhesive only at desirable positions with the printing application device or the liquid jet unit 31 is also applicable to application of the adhesive on the lower surface of the film as in the first through the third embodiments.

E. Fifth Embodiment

Figure 12:
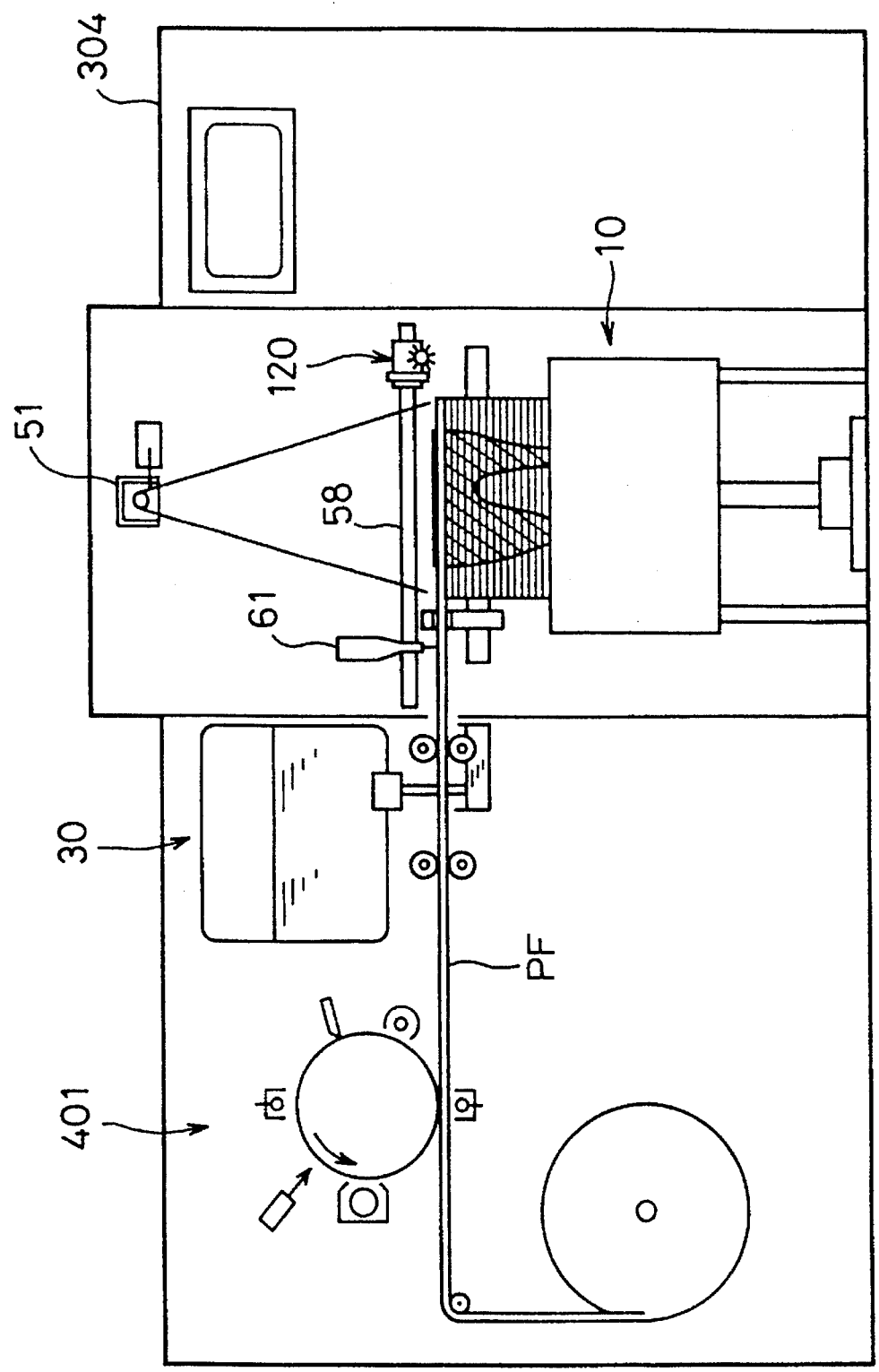
FIG. 12 is a view showing a solid model forming apparatus as a fifth embodiment according to the present invention.

FIG. 12 is a view showing a model forming apparatus 304 as a fifth embodiment according to the present invention. The model forming apparatus 304 includes a xerography unit 401 disposed before the adhesive application unit 30, in place of the mask preparation unit 400 of the model forming apparatus 302 shown in FIG. 8. A toner cleaning device 120 is mounted with the ultrasonic cutter 61 on the rail 58. The xerography unit 401, which has the same principle as laser printers and photo copiers, forms a mask by transferring toner onto the plastic film PF.

FIG. 13 shows a process of forming a three-dimensional object with the model forming apparatus 304. In the process of FIG. 13(A), the xerography unit 401 forms a mask 412 by transferring toner onto the upper surface of the plastic film PF. The mask 412 is formed in an area of logical product (AND) of the effective areas V1 and V2 of the upper and lower films (see FIG. 4). In the process of FIG. 13(B), the adhesive application unit 30 applies the photo-setting adhesive PA on the lower surface of the plastic film PF to form an adhesive layer 96. In the subsequent process of FIG. 13(C), the plastic film PF with the adhesive layer 96 formed thereon is held above the table unit 10 and irradiated with ultraviolet rays emitted downward from the ultraviolet ray exposure unit 51. Part of the adhesive layer 96 placed below the mask 412 remains as a non-solid portion 96b while the non-masked part of the adhesive layer 96 is solidified to become a solid portion 96a.

Figure 13A:
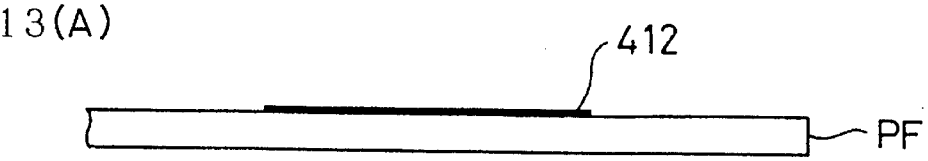
FIGS. 13(A) through 13(E) are cross sectional views showing a process of manufacturing a three-dimensional object in the fifth embodiment.
Figure 13B:
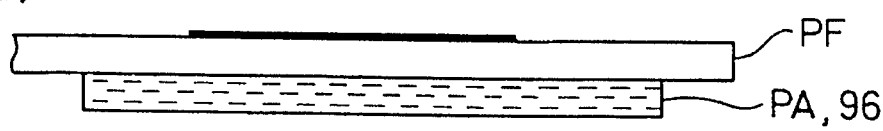
Figure 13C:
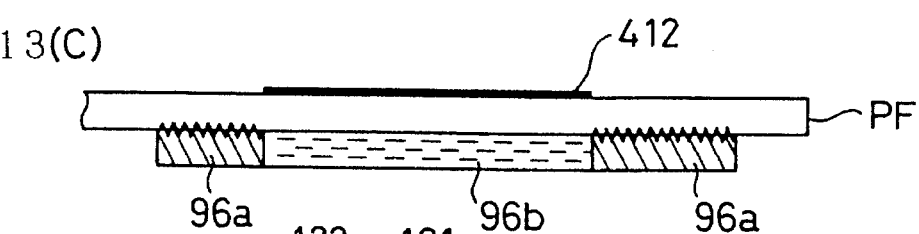
Figure 13D:
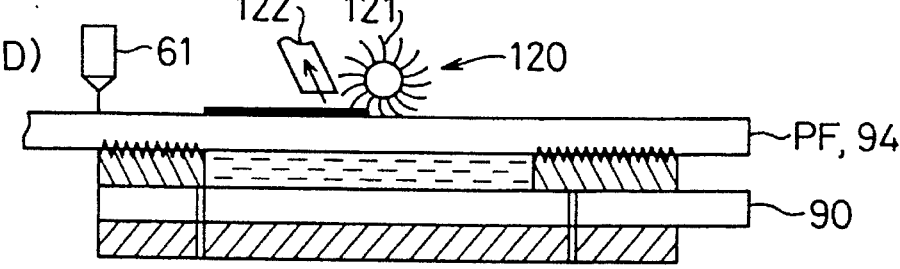

In the process of FIG. 13(D), the table unit 10 is ascended to bring the uppermost cut film 90 on the table 12 into contact with the plastic film PF. In this state, the toner on the plastic film PF is removed with the toner cleaning device 120, and the plastic film PF is cut by a predetermined length with the ultrasonic cutter 61. The toner cleaning device 120 includes a brush 121 and a toner suction element 122. The toner scraped off by a doctor blade and rotation of the brush 121 is sucked with the toner suction element 122 to be removed from the surface of the plastic film PF.

Figure 13E:
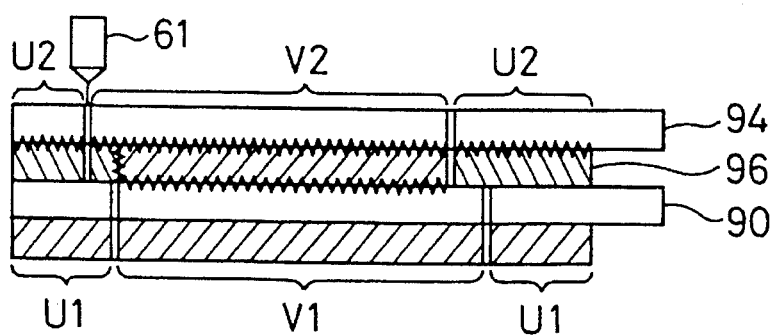

After removal of the toner, the ultraviolet ray exposure unit 51 emits ultraviolet rays again to solidify the non-solid portion 96b of the adhesive layer 96. As a result, the upper cut film 94 is attached with the lower cut film 90 as shown in FIG. 13(E). In the process of FIG. 13(E), the non-required area U2 of the cut film 94 and the adhesive layer 96 is cut into rectangular blocks. The table 12 is then descended by the total thickness of a cut film and an adhesive layer and waits for supply of a next cut film.

The optical mask 410 shown in FIG. 8 is not required in the fifth embodiment described above because the mask 412 is produced directly on the plastic film PF. In the fifth embodiment, the positions of the xerography unit 401 and the adhesive application unit 30 can be exchanged as the process of applying the photo-setting adhesive PA (FIG. 13(B)) being executed before the process of forming the mask 412 (FIG. 13(A)). The fifth embodiment allows the whole film surface to be exposed simultaneously to ultraviolet rays of a relatively high energy level and requires a shorter processing time than the first and the second embodiments. The first and the second embodiments, on the other hand, use a relatively inexpensive light source and do not require the mask preparation unit 400, thus being manufactured at relatively low cost.

F. Sixth Embodiment

Figure 14:
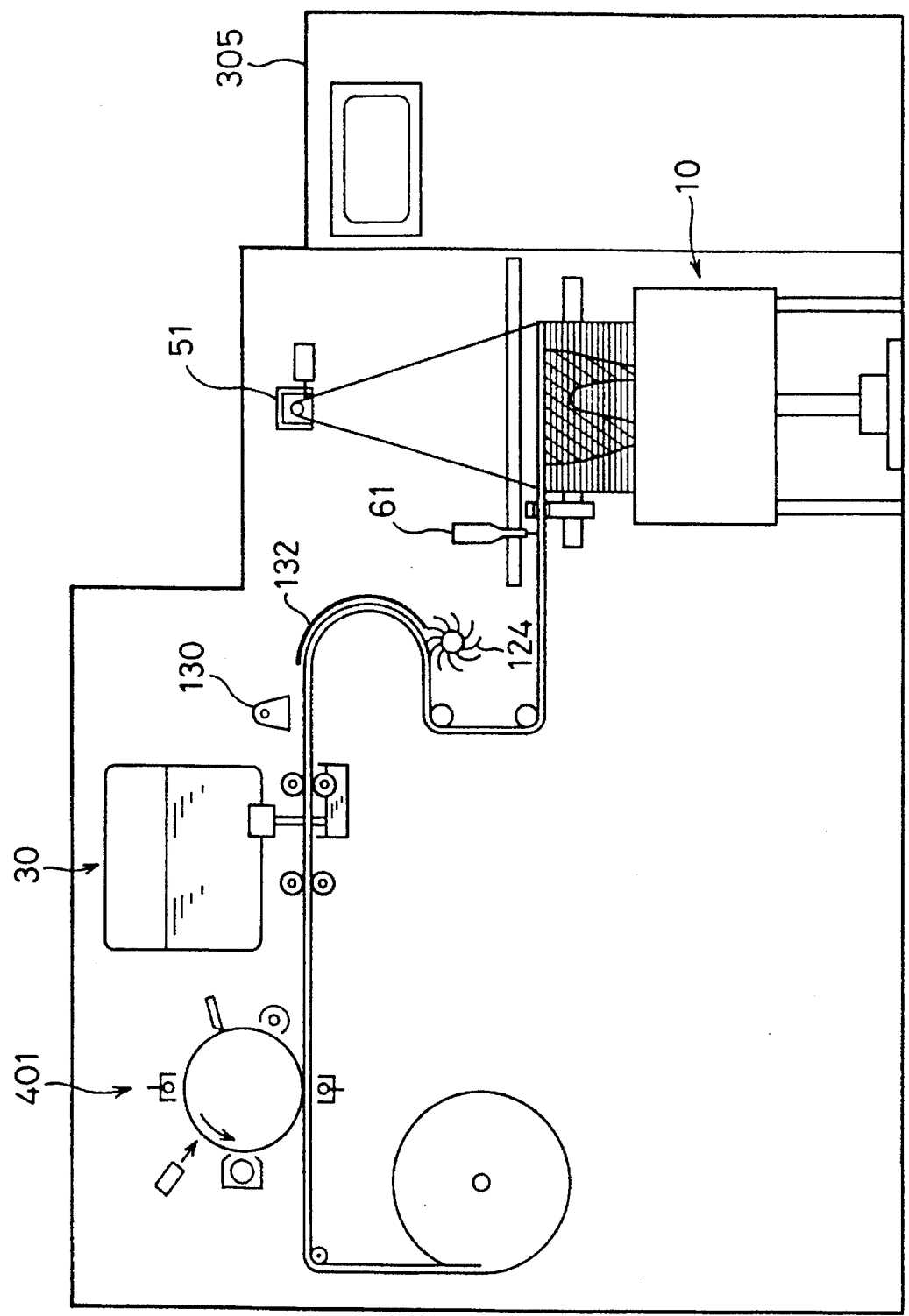
FIG. 14 is a view showing another solid model forming apparatus as a sixth embodiment according to the present invention.

FIG. 14 is a view showing another model forming apparatus 305 as a sixth embodiment according to the present invention. The model forming apparatus 305 does not have the toner cleaning device 120 of the model forming apparatus 304 shown in FIG. 12, but includes a light source 130, a semi-cylindrical film guide 132, and a brush 124 at a downstream side of the adhesive application unit 30.

The model forming process with the model forming apparatus 305 is almost similar to that shown in FIG. 13. The difference is that the light source 130 is used for the solidifying process of FIG. 13(C) in the model forming apparatus 305 of FIG. 14. After the solidifying process, the semi-cylindrical film guide 132 guides and inverts the plastic film PF to make the film surface with the toner transferred thereon is turned downward, where the toner is removed with the brush 124 and a doctor blade. After the plastic film PF is mounted on the uppermost film on the table unit 10, the non-solid portion of the adhesive layer is solidified and the plastic film and the adhesive layer are cut with the ultrasonic cutter 61 in the same manner as the process of FIG. 13 (E).

Since the sixth embodiment described above removes the toner in the course of transportation of the plastic film PF, the processing time is further shortened compared with the apparatus of FIG. 12.

G. Seventh Embodiment

Figure 15:
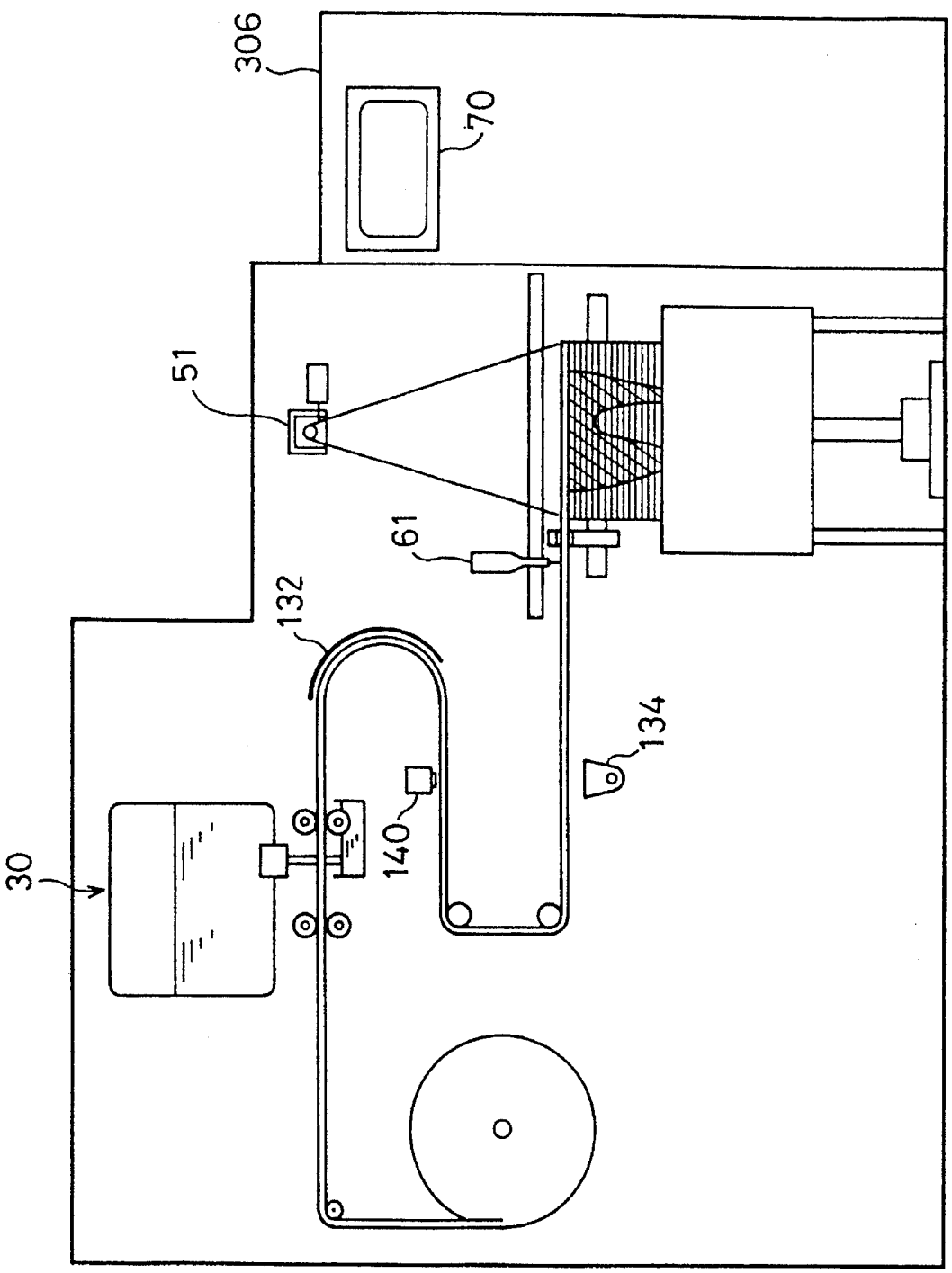
FIG. 15 is a view showing another solid model forming apparatus as a seventh embodiment according to the present invention.

FIG. 15 is a view showing another model forming apparatus 306 as a seventh embodiment according to the present invention. The model forming apparatus 306 does not have the xerography unit 401 nor the brush 124 of the model forming apparatus 305 shown in FIG. 14, but includes a spray 140 for jetting a solidification accelerator at a downstream side of the film guide 132 where the plastic film PF is inverted, and a light source 134 at a position where the film is re-inverted.

Figure 16A:
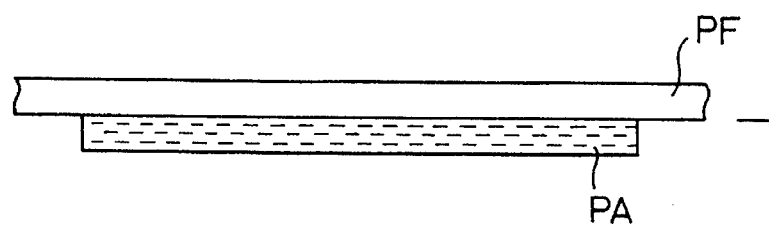
FIGS. 16(A) through 16(C) are cross sectional views showing a process of manufacturing a three-dimensional object in the seventh embodiment.
Figure 16B:
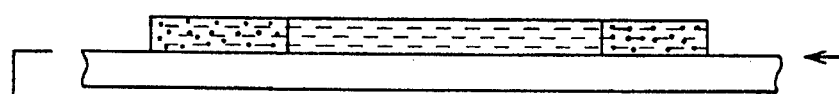
Figure 16C:
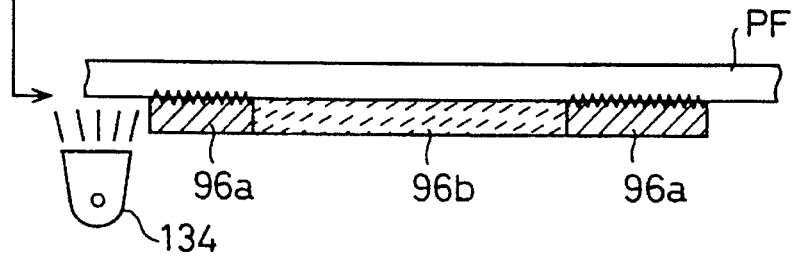

FIG. 16 shows a process of forming a three-dimensional object with the model forming apparatus 306 of FIG. 15. In the process of FIG. 16(A), the photo-setting adhesive PA is applied onto the lower surface of the plastic film PF. When the plastic film PF is inverted by the film guide 132, the solidification accelerator is selectively injected from the spray 140 into part of the photo-setting adhesive PA as shown in FIG. 16(B). The spray 140 can inject the solidification accelerator over the width of the plastic film PF (in the direction perpendicular to the sheet surface of FIG. 15) according to the data supplied from the data processing unit 70.

Examples of the solidification accelerator include a variety of photo-polymerization initiators and dyes such as carbon black and aniline black. For example, the solidification accelerator is produced by mixing carbon black having the particle diameter of 60 nm at the volume ratio of approximately 1% with the photo-setting adhesive PA. Injection of carbon black enhances the light absorption rate of the photo-setting adhesive PA, which allows quicker solidification of the adhesive with a relatively weak light beam.

After injection of the solidification accelerator, the adhesive layer is irradiated with a light beam emitted from the light source 134. Part of the adhesive layer with the solidification accelerator becomes a solid portion 96a through the irradiation process while the residual part without the solidification accelerator remains as a non-solid portion 96b. The non-solid portion 96b is slightly solid to be tacky. The light source 134 emits ultraviolet rays or visible rays weaker than those emitted from the ultraviolet ray exposure unit 51.

A optical mask is not required in the seventh embodiment described above because the solidification accelerator is injected into part of the adhesive layer which is to form the solid portion 96a.

Figure 17A:
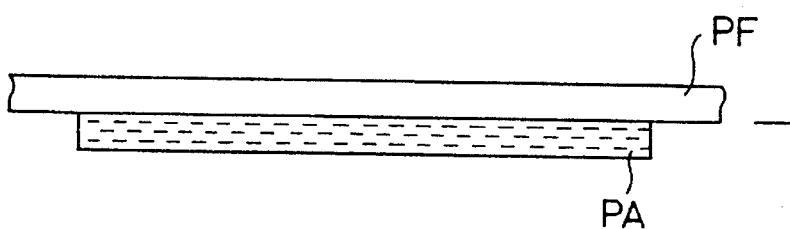
FIGS. 17(A) through 17(C) are cross sectional views showing another process of manufacturing a three-dimensional object in the seventh embodiment.
Figure 17B:
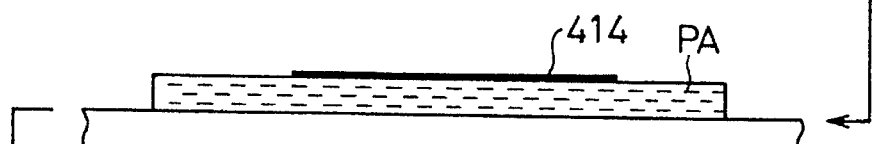
Figure 17C:
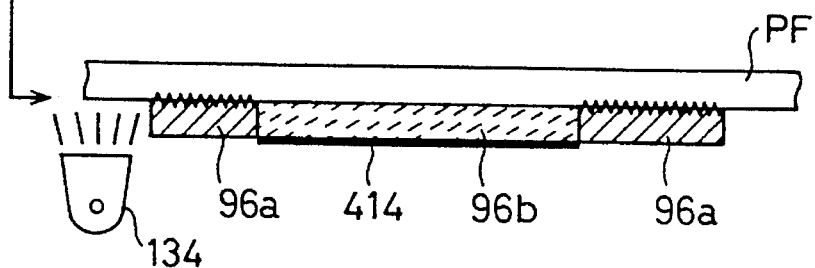

Alternatively, a masking agent can be jet from the spray 140 to form a mask on part of the adhesive layer in forming the non-solid portion 96b. FIG. 17 shows a process of this case, corresponding to the process of FIG. 16. In the process of FIG. 17(B), a mask 414 is formed on the photo-setting adhesive PA. The mask 414 can be composed of toner or black dye. Irradiation of the adhesive layer with a light beam emitted from the light source 134 changes the part of the adhesive layer with the mask 414 to make a non-solid portion 96b and the non-masked part to make a solid portion 96a as shown in FIG. 17(C). Removal of the mask 414 is not required when the film shown in FIG. 17(C) is laid over the uppermost film on the table unit 10 because the mask 414 is stuck to the film under the mask when the non-solid portion 96b is solidified.

In the seventh embodiment, a xerography unit for transferring toner can be used instead of the spray 140 for jetting the solidification accelerator. In such a case, the primary component of the toner can be any material having the function of the solidification accelerator, preferably carbon black.

H. Eighth Embodiment

Figure 18:
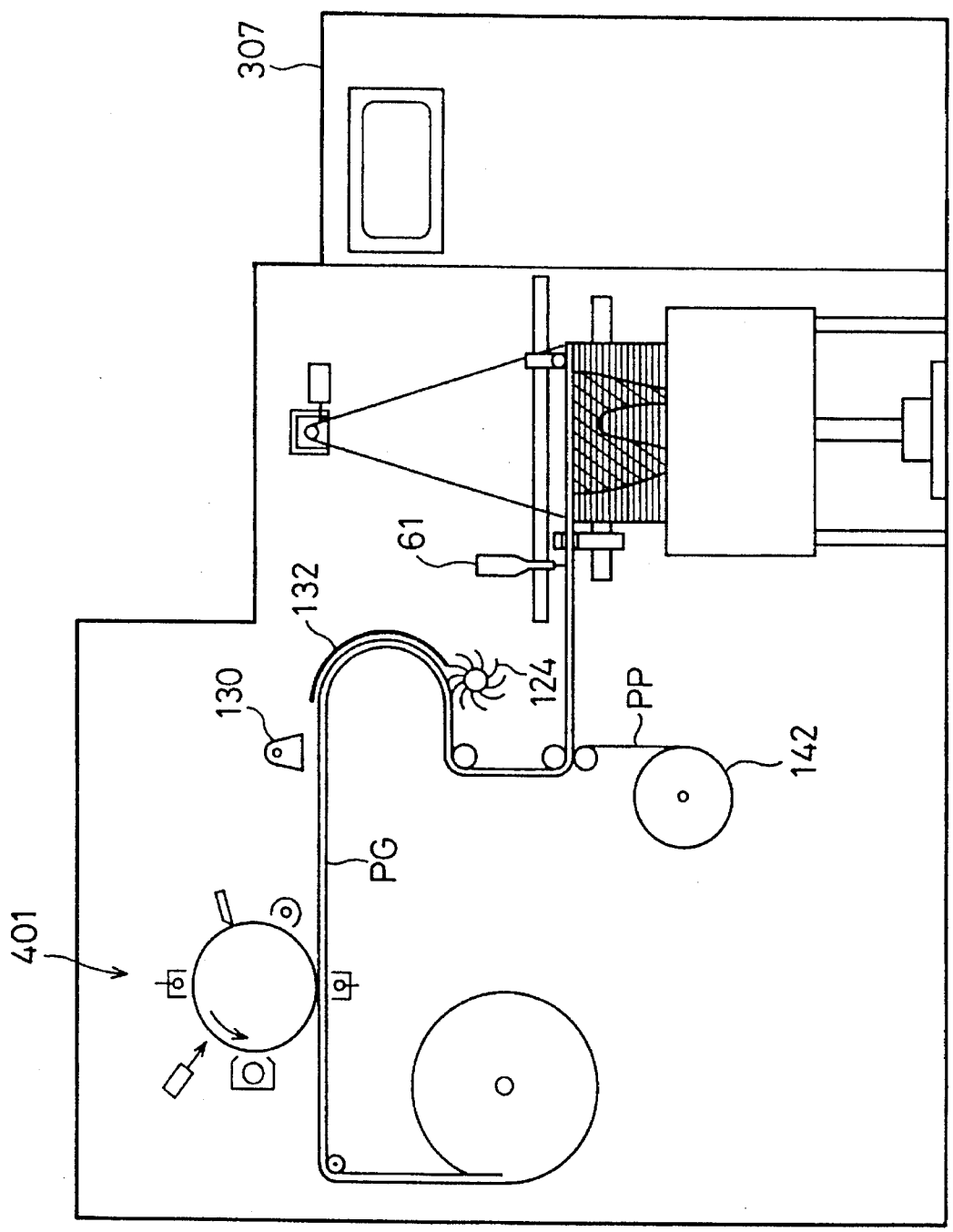
FIG. 18 is a view showing a solid model forming apparatus as an eighth embodiment according to the present invention.

FIG. 18 is a view showing a model forming apparatus 307 as an eighth embodiment according to the present invention. The model forming apparatus 307 uses a three-layered film including a photo-setting adhesive PA as an intermediate layer. The model forming apparatus 307 does not have the adhesive application unit 30 of the model forming apparatus 305 shown in FIG. 14, but has a winding roll 142. The winding roll 142 winds a film covering the layer of the photo-setting adhesive PA to expose the layer of the photo-setting adhesive PA in the air.

FIG. 19 shows a process of forming a three-dimensional object with the model forming apparatus 307 of FIG. 18. FIG. 19(A) shows a cross section of a film PG with an adhesive layer, which is formed as a three-layered film including a plastic film PF, a photo-setting adhesive PA, and a peel film PP. The plastic film PF is composed of a plastic material (for example, polyethylene terephthalate or polycarbonate) adhering to the photo-setting adhesive PA in the process of solidifying the photo-setting adhesive PA. The peel film PP is, on the other hand, composed of a plastic material (for example, polypropylene) not adhering to the photo-setting adhesive PA. The photo-setting adhesive PA used here is not liquid but sticky.

Figure 19A:
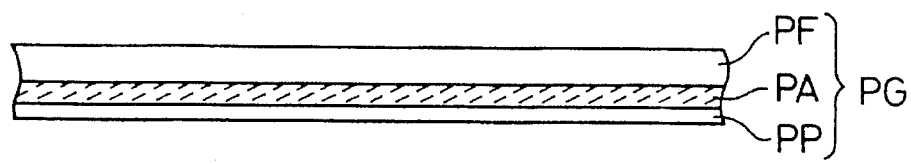
FIGS. 19(A) through 19(E) are cross sectional views showing a process of manufacturing a three-dimensional object in the eighth embodiment.
Figure 19B:
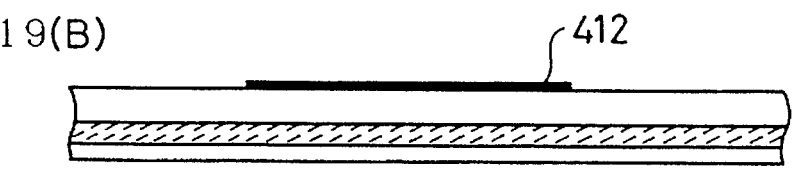
Figure 19C:
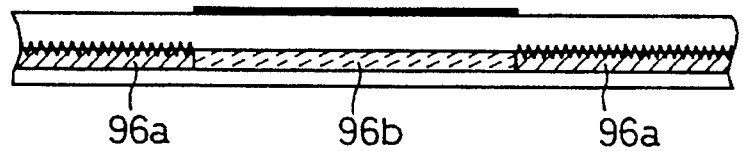
Figure 19D:
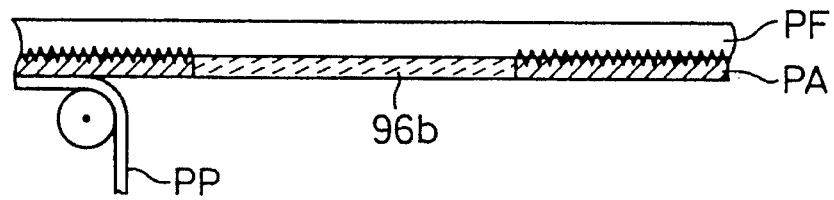
Figure 19E:
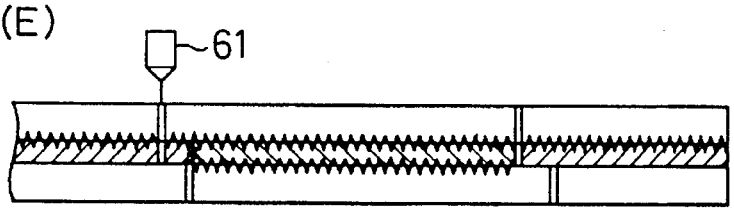

In the process of FIG. 19(B), a mask 412 is formed on the plastic film PF with the xerography unit 401. Irradiation of the film with a light beam emitted from the light source 130 forms a solid portion 96a and a non-solid portion 96b as shown in FIG. 19(C). After the mask 412 is removed with the brush 124 and a doctor blade, the peel film PP is wound up to make the layer of the photo- setting adhesive PA exposed as shown in FIG. 19 (D). The process of FIG. 19 (E), which is equivalent to that of FIG. 13(E), solidifies the non-solid portion 96b of FIG. 19 (D) to make the upper plastic film and the lower plastic film adhere to each other.

The eighth embodiment described above uses the plastic film PG originally having the photo-setting adhesive PA and thus does not require the application device for the photo-setting adhesive PA.

I. Ninth Embodiment

Figure 20:
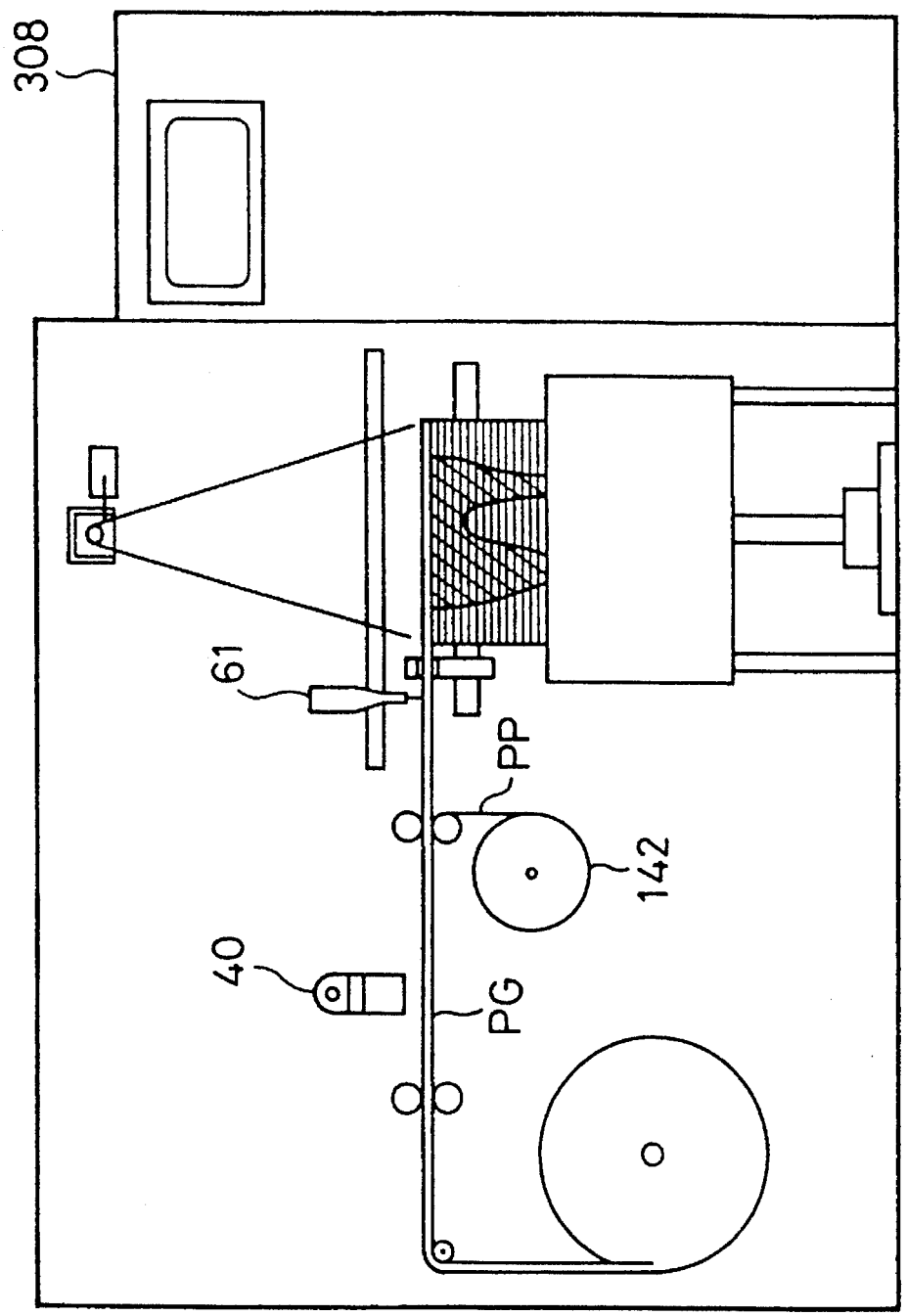
FIG. 20 is a view showing a solid model forming apparatus as a ninth embodiment according to the present invention.

FIG. 20 is a view showing a model forming apparatus 308 as a ninth embodiment according to the present invention. The model forming apparatus 308 does not have the xerography unit 401, the light source 130, the film guide 132, nor the brush 124 of the model forming apparatus 305 shown in FIG. 18, but comprises a negative pattern exposure unit 40. The model forming apparatus 308 processes the plastic film PG having an adhesive layer as in the apparatus of FIG. 18. The negative pattern exposure unit 40 has the same structure as that shown in FIG. 1, and selectively solidifies part of the photo-setting adhesive PA according to the data supplied from the data processing unit 70.

The structure of the ninth embodiment described above does not require the xerography unit 401, thus making the whole apparatus desirably compact.

J. Tenth Embodiment

FIG. 21 is a view showing another model forming apparatus 309 as a tenth embodiment according to the present invention. The model forming apparatus 309 has a thermal head 144 and a light source 130 in place of the negative pattern exposure unit 40 of the model forming apparatus 308 shown in FIG. 20.

FIG. 22 shows a process of forming a three-dimensional object with the model forming apparatus 307 of FIG. 21. FIG. 22(A) shows a cross section of a film PH with an adhesive layer to be used in this apparatus, which is formed as a three-layered film including a plastic film PF, a photo-setting adhesive PA, and a heat shrinkable film PS. Part of the heat shrinkable film PS which is heated with the thermal head 144 is shrunk to form an opening. The photo-setting adhesive PA used here is sticky and inhibited from being solidified when exposed to oxygen.

Figure 22A:
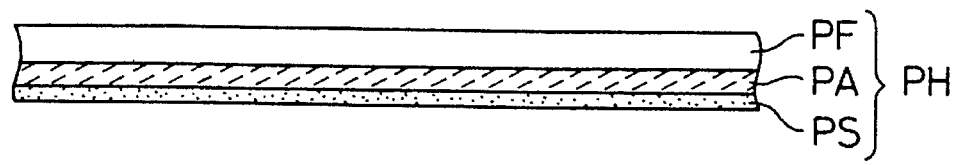
FIGS. 22(A) through 22(E) are cross sectional views showing a process of manufacturing a three-dimensional object in the tenth embodiment.
Figure 22B:
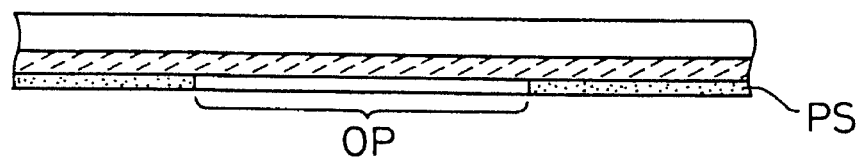
Figure 22C:
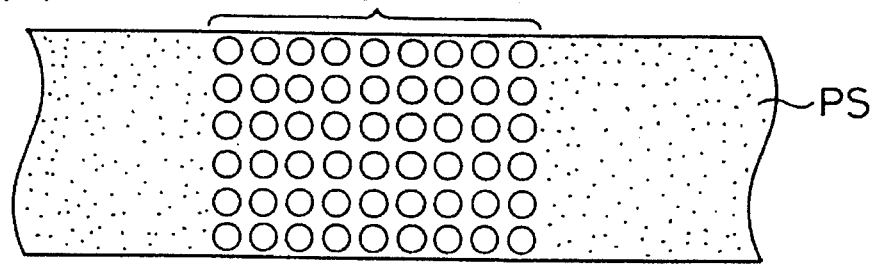

In the process of FIG. 22(B), the thermal head 144 forms an opening area OP in the heat shrinkable film PS according to the data supplied from the data processing unit 70. FIG. 22(C) is a bottom view showing the film of FIG. 22(B). The heat shrinkable film PS is not required to be completely removed from the opening area OP but can partly remain in the opening area OP as shown in FIG. 22 (C).

Figure 22D:
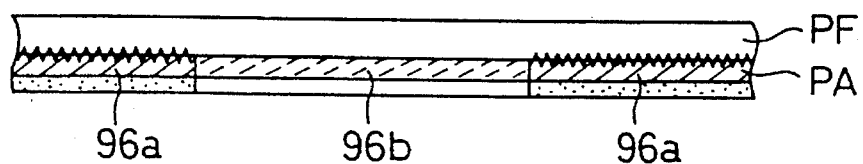
Figure 22E:
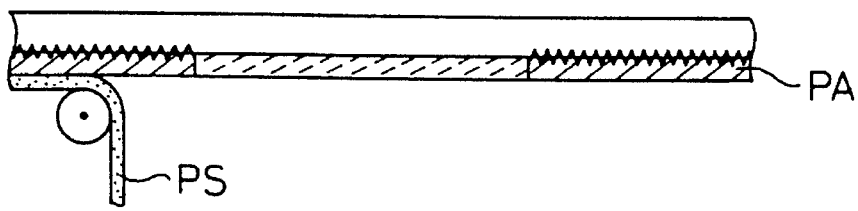

In the process of FIG. 22(D), the film is irradiated with a light beam emitted from the light source 130. In the opening area OP, the photo-setting adhesive PA comes in contact with oxygen included in the air and is thereby not solidified with the relatively weak light beam emitted from the light source 130 to form a non-solid portion 96b. The photo-setting adhesive PA in the area other than the opening area OP is solidified with the light beam from the light source 130 to form a solid portion 96a. The heat shrinkable film PS is then wound up to expose the photo-setting adhesive PA in the air as shown in FIG. 22(E), which corresponds to the process of FIG. 19(D). The tenth embodiment has the same advantages as the ninth embodiment.

K. Eleventh Embodiment

FIG. 23 is a view showing a model forming apparatus 310 as an eleventh embodiment according to the present invention. The model forming apparatus 310 includes a film supply unit 150 for supplying cut films CF each being cut in advance by a predetermined length, a film feeding unit 160 for transporting the cut film CF supplied from the film supply unit 150, a xerography unit 401, an ultrasonic cutter 61, an antistatic brush 180, and a hot press roller 182 other than the table unit 10 and the data processing unit 70. The ultrasonic cutter 61, the antistatic brush 180, and the hot press roller 182 are movable along a rail 58.

Figure 24A:
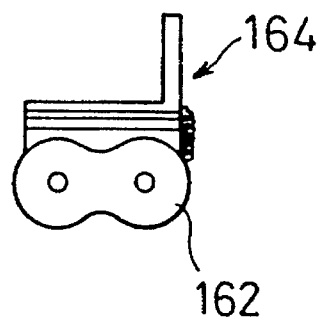
FIGS. 24(A) through 24(C) are views showing the structure of a film feeding unit in the eleventh embodiment.
Figure 24B:
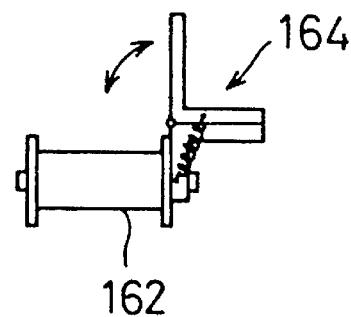
Figure 24C:
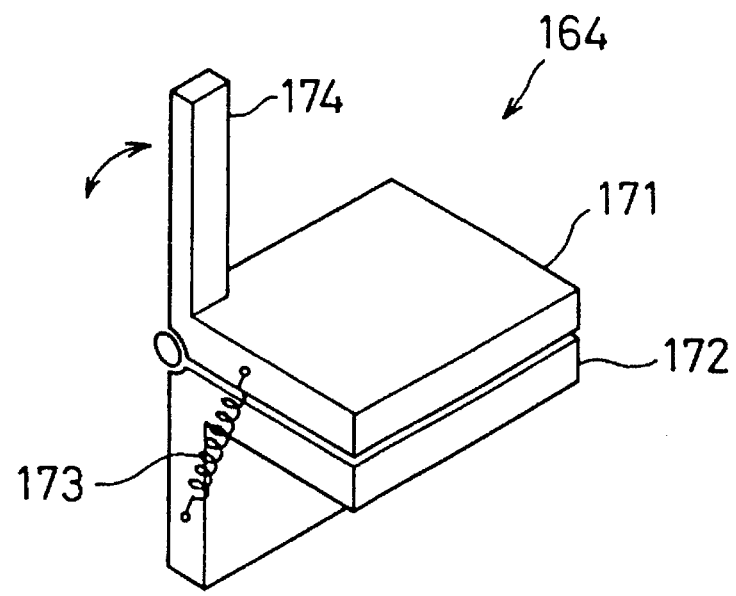

The film feeding unit 160 further includes an endless chain 162, a plurality of film holding mechanisms 164 disposed at predetermined intervals on the chain 162, sprockets 166, and a motor (not shown) for driving the sprocket 166 to rotate the chain 162. The chain 162, the holding mechanisms 164, and the sprockets 166 are provided on respective end of the width of the cut film CF (or in a direction perpendicular to the running direction of the film). FIG. 24 shows the chain 162 and the film holding mechanism 164. FIG. 24(A) is a front view; FIG. 24(B) is a side view; and FIG. 24(C) is a perspective view illustrating the film holding mechanism 164.

The film holding mechanism 164 comprises two plate members 171 and 172, a spring 173 engaged with side surfaces of the plate members 171 and 172, and an opening click 174 protruded upward from the upper plate member 171. The two plate members 171 and 172 respectively have a plurality of protrusions on inner surfaces thereof for securely holding the film. At a position P1 in FIG. 23 where the cut film CF is supplied from the film supply unit 150, the click 174 shown in FIG. 24(C) is pressed down along a guide (not shown) to open the two plate members 171 and 172. After the cut film CF passes through the position P1, the two plate members 171 and 172 are closed again to hold a front end of the cut film CF. Since the predetermined interval between the holding mechanisms 164 is set to be identical with the length of the cut film CF, a rear end of the cut film CF is held at the position P1 in a similar manner. The cut film CF thus held is transported clockwise along the chain 162. At a specific position above the table unit 10, the two pairs of holding mechanisms 164 respectively holding the front end and the rear end of the cut film CF are opened to place the cut film CF on the table unit 10.

FIG. 25 shows a process of forming a three-dimensional object with the model forming apparatus 310 of FIG. 23. In the process of FIG. 25 (A), the xerography unit 401 deposits a powdery adhesive PB onto a cut film 114. An area where the powdery adhesive PB is deposited corresponds to an area of logical product (AND) of effective areas V1 and V2 of upper and lower films (see FIG. 25 (B)). The powdery adhesive PB includes toner used for copying machines except a coloring agent (such as carbon black). For painting the cut film 114 with a desirable color, a coloring agent of the desirable color is included in the powdery adhesive PB.

Figure 25A:
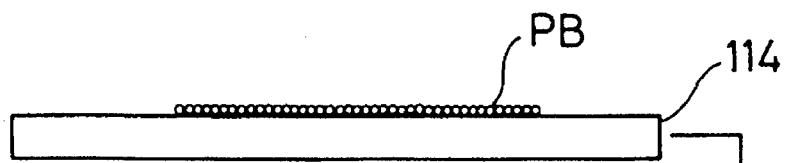
FIGS. 25(A) through 25(E) are cross sectional views showing a process of manufacturing a three-dimensional object in the eleventh embodiment.
Figure 25B:
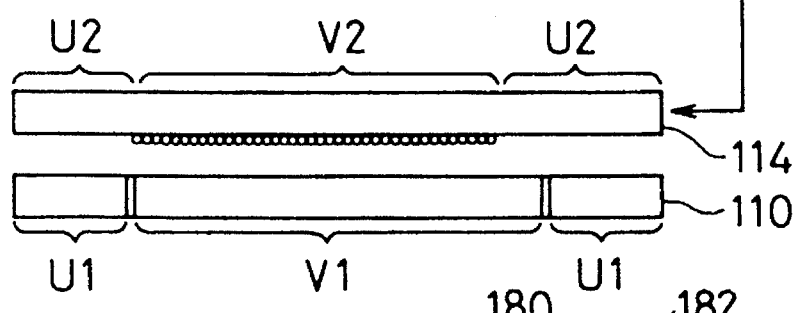
Figure 25C:
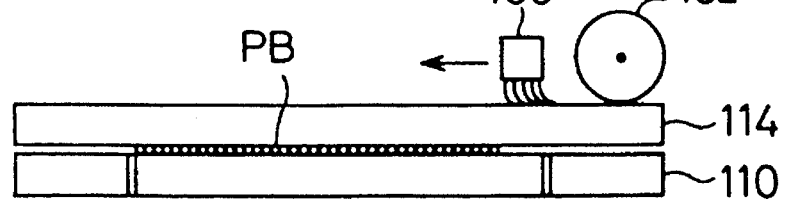
Figure 25D:
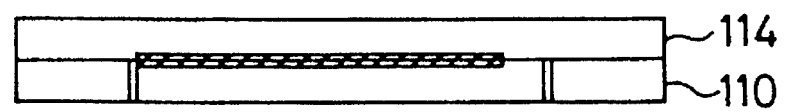
Figure 25E:
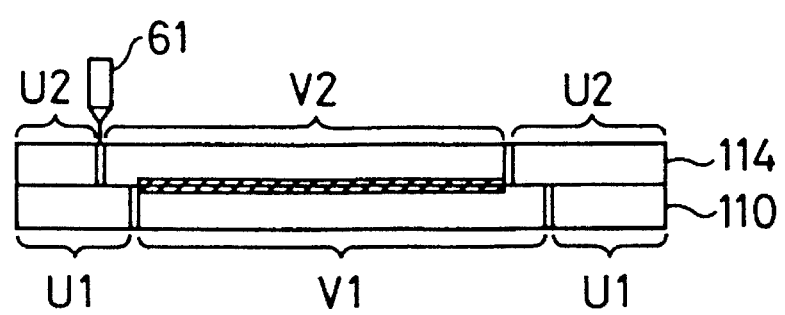

In the process of FIG. 25(B), the cut film 114 is inverted by the film feeding unit 160 to be positioned above the table unit 10. In the process of FIG. 25(C), the cut film 114 is placed on an uppermost cut film 110 on the table unit 10. Simultaneously with static elimination by the antistatic brush 180, the hot press roller 182 melts the powdery adhesive PB to attach the two cut films 110 and 114 with each other (FIG. 25(C)). The upper cut film 114 is then cut with the ultrasonic cutter 61 as shown in FIG. 25(E).

When the melting temperature of the powdery adhesive PB is approximately 140° C., the hot press roller 182 is preferably heated to approximately 200° C. In this case, it is preferable that the cut films 110 and 114 are resistant to no lower than 200° C. Polycarbonate can be used as such films, for example. Paper sheets and ceramic sheets can be also used instead of the plastic films.

Incidentally, the adhesion process can be executed by pressing without heating. The toner described in JAPANESE PATENT LAID-OPEN GAZETTE No. Sho-59-18935 without a coloring agent can be used as the powdery adhesives adhering only by pressure.

The eleventh embodiment has the advantage that the powdery adhesive PB can be easily handled.

L. Twelfth Embodiment

Figure 26:
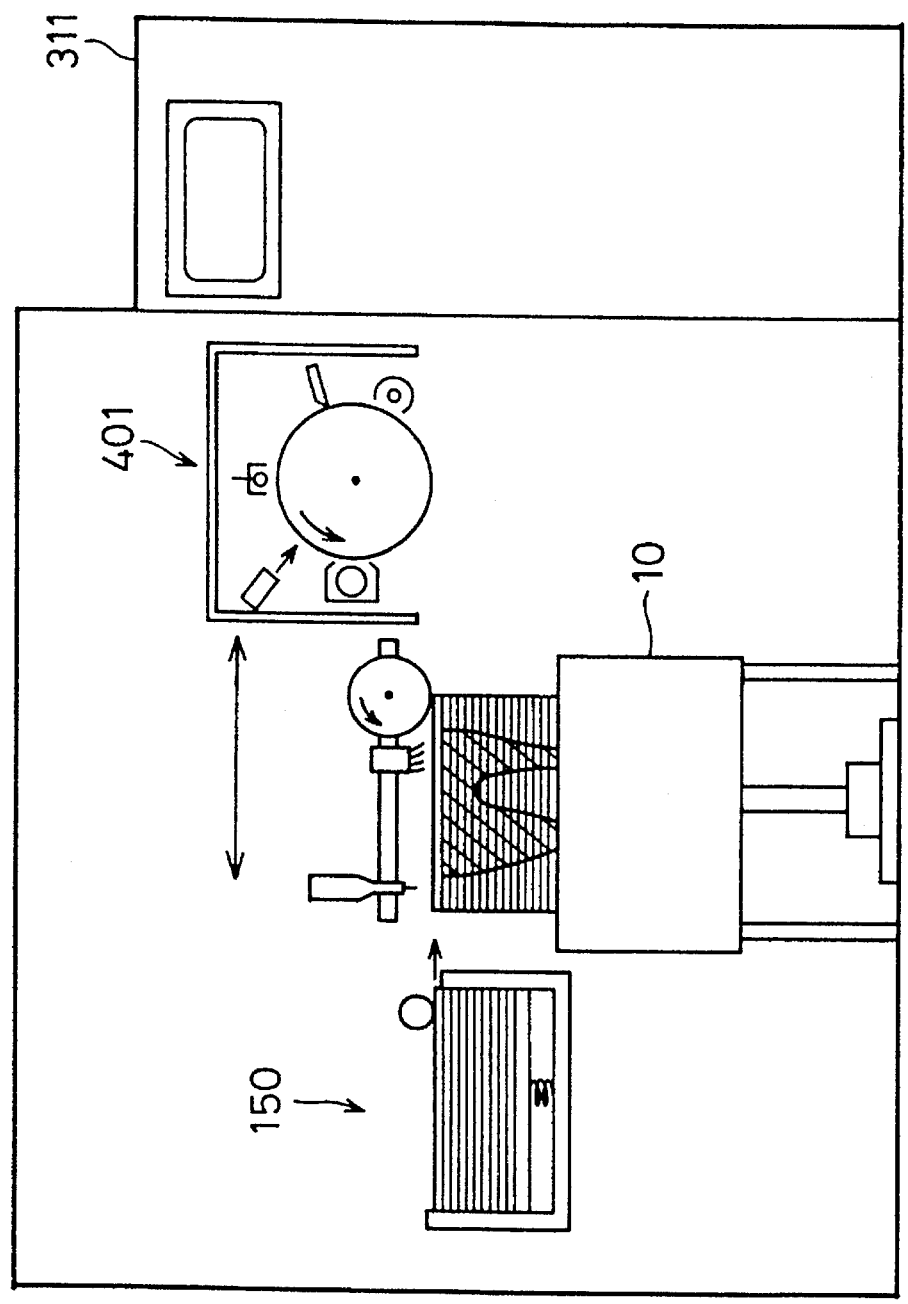
FIG. 26 is a view showing another solid model forming apparatus as a twelfth embodiment according to the present invention.
Figure 27A:
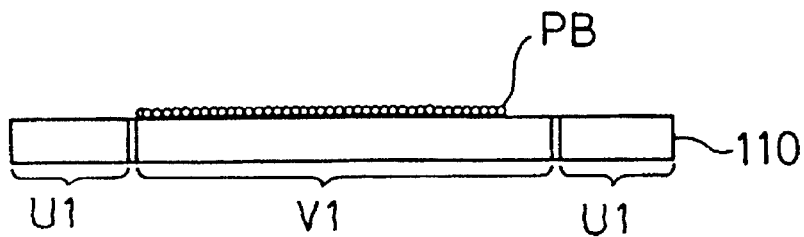
FIGS. 27(A) through 27(E) are cross sectional views showing a process of manufacturing a three-dimensional object in the twelfth embodiment.
Figure 27B:
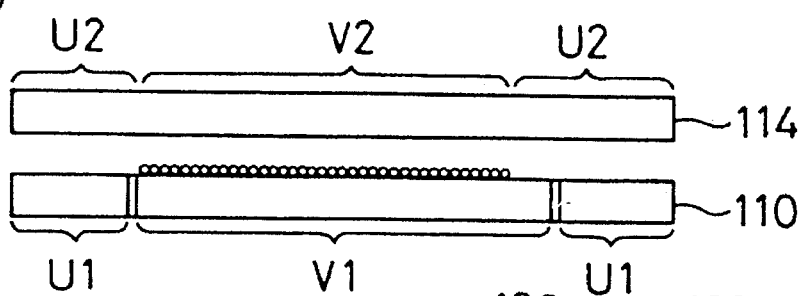
Figure 27C:
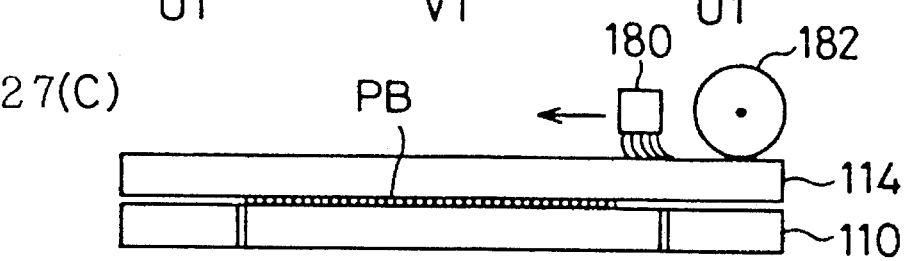
Figure 27D:
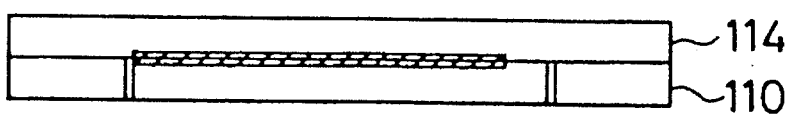
Figure 27E:
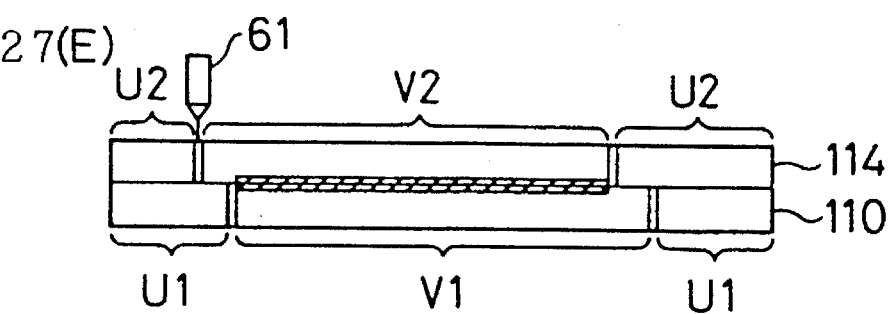

FIG. 26 is a view showing a model forming apparatus 311 as a twelfth embodiment according to the present invention. The model forming apparatus 311 does not have the film feeding unit 160 of the model forming apparatus 310 shown in FIG. 23. In this embodiment, the xerography unit 401 is movable from side to side, and the film supply unit 150 is disposed adjacent to the table unit 10.

FIG. 27 shows a process of forming a three-dimensional object with the model forming apparatus 311 of FIG. 26. In the process of FIG. 27(A), the xerography unit 401 deposits the powdery adhesive PB onto the uppermost cut film 110 on the table unit 10. In the process of FIG. 27(B), a new cut film 114 is transported and placed on the cut film 110 by the film feeding unit 160. Steps after FIG. 27(C) are identical with those after FIG. 25(C).

The model forming apparatus 311 of FIG. 26 has the same advantage as the model forming apparatus 310 shown in FIG. 23. There is a difference, however, that the apparatus of FIG. 26 does not require the film feeding apparatus 160 whereas the apparatus of FIG. 23 does not require a mechanism for moving the xerography unit 401.

M. Thirteenth Embodiment

Figure 28:
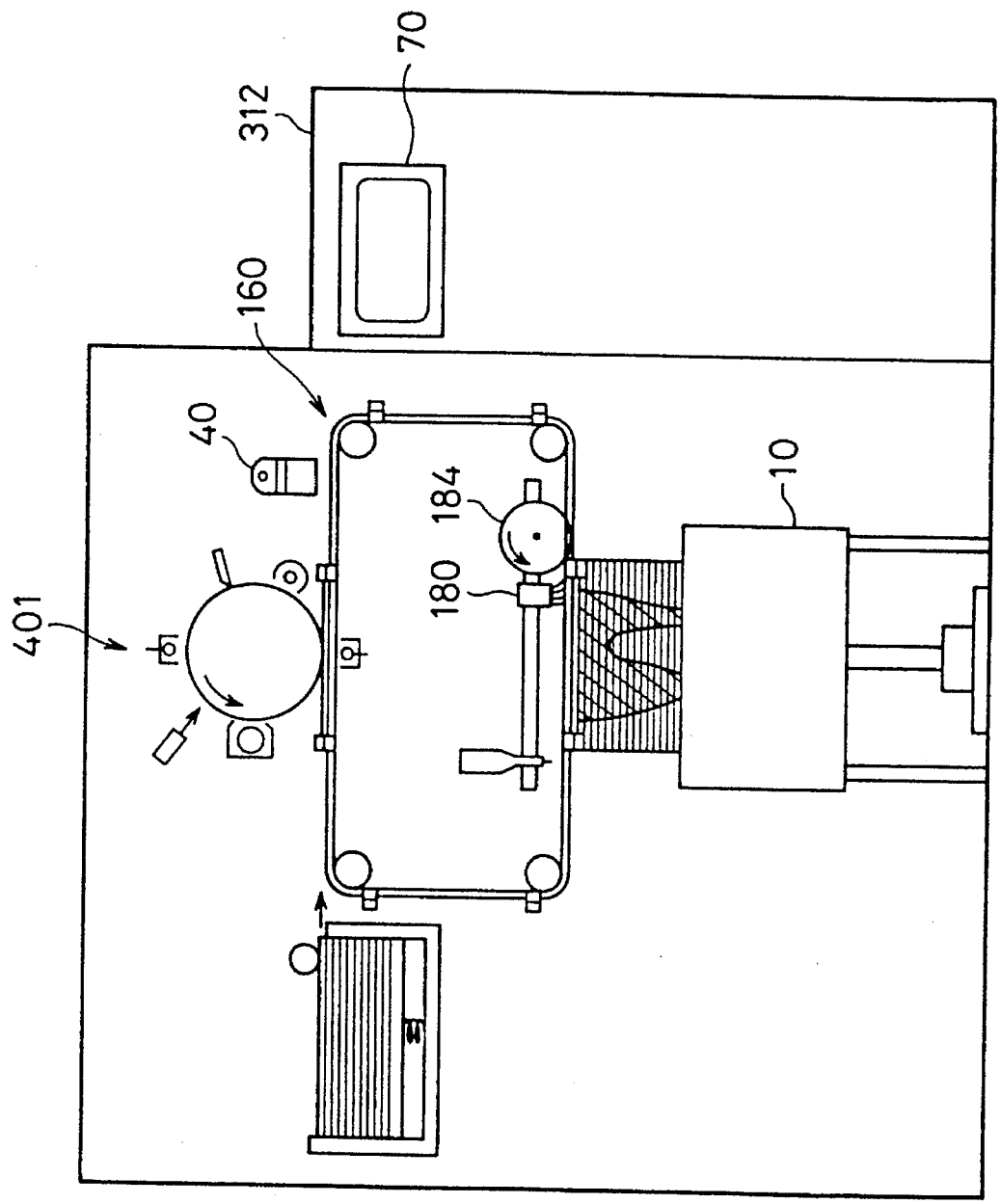
FIG. 28 is a view showing a solid model forming apparatus as a thirteenth embodiment according to the present invention.

FIG. 28 is a view showing another model forming apparatus 312 as a thirteenth embodiment according to the present invention. The model forming apparatus 312 includes a negative pattern exposure unit 40 at the downstream side of the xerography unit 401 of the model forming apparatus 310 shown in FIG. 23, and has a pressure roller 184 in place of the hot press roller 182.

FIG. 29 Shows a process of forming a three-dimensional object with the model forming apparatus 312 of FIG. 28. In the process of FIG. 29(A), the xerography unit 401 deposits microcapsules MC containing an adhesive over the whole surface of a cut film 114. The microcapsules contain a photo-setting adhesive in place of a color producing agent, which is generally contained in microcapsules used for color copying machines.

Figure 29A:
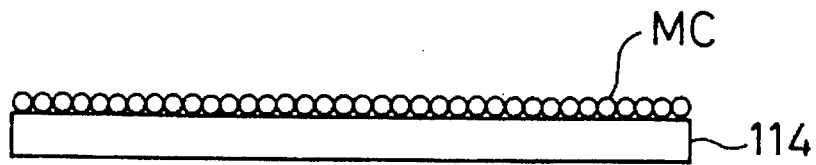
FIGS. 29(A) through 29(E) are cross sectional views showing a process of manufacturing a three-dimensional object in the thirteenth embodiment.
Figure 29B:
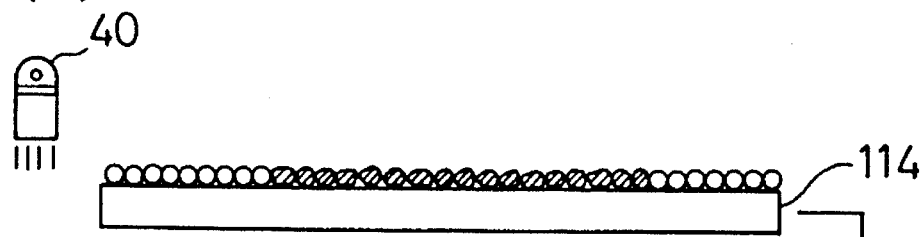

In the process of FIG. 29(B), the negative pattern exposure unit 40 exposes part of the microcapsules MC according to the data supplied from the data processing unit 70 in order to solidify the part of the microcapsules MC. A non-solid part of the microcapsules is then raptured by applying a large pressure onto the microcapsules. An area where the microcapsules are raptured corresponds to an area of logical product (AND) of effective areas V1 and V2 of upper and lower films (see FIG. 29(C)).

Figure 29C:
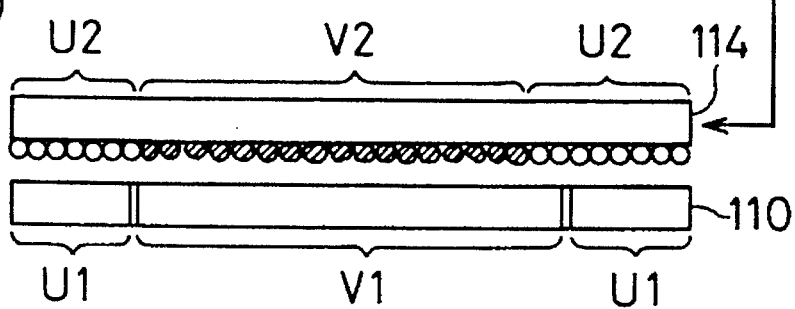
Figure 29D:
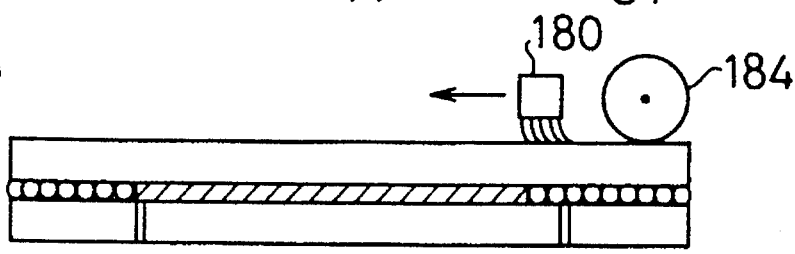
Figure 29E:
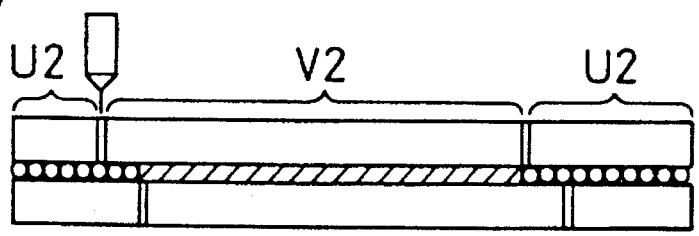

In the process of FIG. 29(C), the cut film 114 is inverted by the film feeding unit 160 to be positioned above the table unit 10. In the process of FIG. 29(D), the cut film 114 is placed on an uppermost cut film 110 on the table unit 10. Simultaneously with elimination of static electricity by the antistatic brush 180, the two cut films 110 and 114 are attached with each other by the pressure roller 184. The upper cut film 114 is then cut with the ultrasonic cutter 61 (FIG. 29 (E)).

The thirteenth embodiment has the similar advantage as the eleventh embodiment. The movable negative pattern exposure unit 40 can be added to the model forming apparatus 311 using the microcapsules MC shown in FIG. 26.

The invention is not limited to the above embodiments, but there can be many modification, changes, and alterations as follows:

(1) In the above embodiments, some apparatus use film or sheet rolls while other apparatus use cut films or cut sheets which are cut in advance by a predetermined length. Any apparatus in the above embodiments can, however, use either film or sheet rolls or cut films or cut sheets. Film or sheet rolls can be used more efficiently according to the size of a target three-dimensional object, thus reducing the waste of film or sheet.

(2) Although the negative pattern generation unit 71 of FIG. 5 and the application pattern generation unit 81 of FIG. 11 are constructed as hardware circuits, the same functions can be realized by software programs executed by a computer.

(3) A film cutter for cutting thin films, which has a cutting edge moving according to the data representing a cutting line, can be used as means for cutting films or sheets.

(4) Similar apparatus to those of the above embodiments can be constructed by other combinations of the means used in the above embodiments.

As described above, the method and apparatus of the invention form a three-dimensional object by laminating sheet members of various materials.

Although the present invention has been described and illustrated in detail, it is clearly understood that the same is by way of illustration and example only and is not to be taken by way of limitation, the spirit and scope of the present invention being limited only by the terms of the appended claims.

Potential Application in Industrial Field

The laminated model forming method and the laminated model forming apparatus according to the present invention can be applicable to manufacture of three-dimensional models, product prototypes, and small quantity products.

What is claimed is:

1. A method of forming a three-dimensional object by laminating sheet members within a solid model forming apparatus that includes a data processing unit, said method comprising the steps of:

(A) preparing a first sheet member, which is cut into a first usable area constituting said three-dimensional object and a first excess area not constituting said three-dimensional object;

(B) feeding a second sheet member above said first sheet member while selectively interposing a powdery adhesive layer between said first and second sheet members using a xerography unit that receives cross-sectional data of said three-dimensional object from said, data processing unit, said powdery adhesive layer being formed in at least part of an area which is included in both of said first usable area of said first sheet member and a second usable area of said second sheet member;

(C) attaching said first and second sheet members with each other by said powdery adhesive layer;

(D) cutting said second sheet member into said second usable area and a second excess area; and (E) successively laminating sheet members through repetition of said steps (B) through (D) to form said three-dimensional object.

2. A method in accordance with claim 1, wherein said step (B) comprises a step of depositing said powdery adhesive onto at least one of opposed surfaces of said first and second sheet members.

3. A method in accordance with claim 2, wherein said step (C) comprises a step of heating and pressing down said first and second sheet members by heating-pressing means to melt said powdery adhesive, thereby attaching said first and second sheet members with each other by said powdery adhesive.

4. Art apparatus for forming a three-dimensional object by laminating sheet members, comprising:

a vertically movable table for holding a laminated object formed by laminating sheet members, each sheet member being cut into a usable area constituting said three-dimensional object and an excess area not constituting said three-dimensional object;

a xerography unit for selectively depositing a powdery adhesive onto at least one of an upper surface of a first sheet member positioned uppermost on said laminated object and a lower surface of a second sheet member to be laminated on said first sheet member, said powdery adhesive being deposited in at least part of an area included in both of a first usable area of said first sheet member and a second usable area of said second sheet member;

sheet feeding means for feeding and placing said second sheet member of a predetermined length onto said first sheet member;

attaching means for attaching said first and second sheet members with each other by said powdery adhesive at least by applying a pressure onto said second sheet member; and cutting means for cutting said second sheet member into said second usable area and a second excess area.

5. An apparatus in accordance with claim 4, wherein said first and second sheet members am paper sheets which are cut in advance into said predetermined length.

6. An apparatus in accordance with claim 5, wherein said attaching means comprises means for melting said powdery adhesive by applying heat and pressure onto said first and second sheet members, to thereby attach said fast and second sheet members with each other via said powdery adhesive.

7. An apparatus for forming a three-dimensional object by laminating sheet members, comprising:

a vertically movable table for holding a laminated object formed by laminating sheet members, each sheet member being cut into a usable area constituting said three-dimensional object and an excess area not constituting said three-dimensional object;

sheet feeding means for feeding said sheet members of a predetermined length towards said table;

application means for applying a photo-setting adhesive on a lower surface of a first sheet member supplied from said sheet feeding means;

a xerography unit for selectively transferring a masking agent directly onto said photo-setting adhesive thus forming a mask; and a light source for irradiating said member such that a part of said photo-setting adhesive corresponding to said mask is not solidified and a part of said photo-setting adhesive corresponding to at least one of a second excess area of a second sheet member positioned uppermost on said laminated object and a first excess area of said first sheet member is solidified;

attaching means for pressing said first sheet member towards said second sheet member and irradiating a non-solid portion of said photo-setting adhesive with a predetermined light beam, to thereby solidify said non-solid portion to attach said first and second sheet members with each other by said photo-setting adhesive; and cutting means for cutting said first sheet member and said solid photo-setting adhesive into a first usable area and said first excess area.

8. An apparatus for forming a three-dimensional object by laminating sheet members, said apparatus comprising:

a vertically movable table for holding a laminated object formed by laminating sheet members, each sheet member being cut into a usable area constituting said three-dimensional object and an excess area not constituting said three-dimensional object;

sheet feeding means for feeding a three-layered sheet member of a predetermined length towards said table, said three-layered sheet member comprising a first sheet member, a cover sheet, and an adhesive layer interposed between said first sheet member and said cover sheet, said cover sheet being a heat shrinkable film;

means for selectively shrinking and rupturing a portion of said cover sheet in order to form an opening in said cover sheet thus exposing a portion of said adhesive layer;

a light source for irradiating said three-layered sheet member in order to solidify a part of said adhesive layer corresponding to at least one of a second excess area of a second sheet member positioned uppermost on said laminate and a first excess area of said first sheet member;

removal means for removing said cover sheet from said three-layered sheet member;

attaching means for pressing said first sheet member of said layered sheet member without said cover sheet towards said second sheet member and solidifying a non-solid portion of said adhesive layer, to thereby attach said first and second sheet members with each other by said adhesive layer; and cutting means for cutting said first sheet member and said solid adhesive layer into a first usable area and said first excess area.

9. An apparatus for forming a three-dimensional object by laminating sheet members, comprising:

a vertically movable table for holding a laminated object formed by laminating sheet members, each sheet member being cut into a usable area constituting said three-dimensional object and an excess area not constituting said three-dimensional object;

sheet feeding means for feeding said sheet members of a predetermined length towards said table;

a depositing unit for depositing micro-capsules containing a photo-setting adhesive over an area of said predetermined length on a lower surface of a first sheet member supplied from said sheet feeding means;

irradiation means for selectively irradiating said micro-capsules deposited on said first sheet member with a predetermined light beam to solidify a first part of said micro-capsules corresponding to either a second excess area of a second sheet member positioned uppermost on said laminated object or to a first excess area of said first sheet member;

rupturing means for rupturing a non-solid part of said micro-capsules corresponding to at least part of an area which is included in both of a first usable area of said first sheet member and a second usable area of said second sheet member;

attaching means for pressing said first sheet member towards said second sheet member and for attaching said first and second sheet members with each other by said photo-setting adhesive; and cutting means for cutting said first sheet member and said solid photo-setting adhesive into a first usable area and said first excess area.

10. An apparatus for forming a three-dimensional object by laminating sheet members, comprising:

a vertically movable table for holding a laminated object formed by laminating sheet members, each sheet member being cut into a usable area constituting said three-dimensional object and an excess area not constituting said three-dimensional object;

sheet feeding means for feeding said sheet members of a predetermined length towards said table;

application means for applying a photo-setting adhesive on a lower surface of a first sheet member supplied from said sheet feeding means;

a xerography unit for selectively transferring a solidification accelerator directly onto said photo-setting adhesive, thus forming a solidification region of said photo-setting adhesive that contains said solidification accelerator; and a light source for irradiating said first sheet member such that a part of said photo-setting adhesive not corresponding to said solidification region is not solidified and a part of said photo-setting adhesive corresponding to at least one of a second excess area of a second sheet member positioned uppermost on said laminated object and a first excess area of said first sheet member is solidified;

attaching means for pressing said first sheet member towards said second sheet member and irradiating a non-solid portion of said photo-setting adhesive with a predetermined light beam, to thereby solidify said non-solid portion to attach said first and second sheet members with each other by said photo-setting adhesive; and cutting means for cutting said first sheet member and said solid photo-setting adhesive into a first usable area and said first excess area.

* * * * *